US012095809B2

(12) United States Patent
Wang

(10) Patent No.: US 12,095,809 B2
(45) Date of Patent: *Sep. 17, 2024

(54) SUPPRESSING VIRUS PROPAGATION IN A LOCAL AREA NETWORK

(71) Applicant: Hangzhou DPtech Technologies Co., Ltd., Zhejiang (CN)

(72) Inventor: Futao Wang, Zhejiang (CN)

(73) Assignee: HANGZHOU DPTECH TECHNOLOGIES CO., LTD., Hangzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/325,957

(22) Filed: May 30, 2023

(65) Prior Publication Data

US 2023/0328100 A1 Oct. 12, 2023

Related U.S. Application Data

(62) Division of application No. 17/151,032, filed on Jan. 15, 2021, now Pat. No. 11,736,514.

(30) Foreign Application Priority Data

Jan. 17, 2020 (CN) .......................... 202010053815.1

(51) Int. Cl.
H04L 9/40 (2022.01)
(52) U.S. Cl.
CPC ........ *H04L 63/145* (2013.01); *H04L 63/1466* (2013.01)
(58) Field of Classification Search
CPC ............... H04L 63/145; H04L 63/1466; H04L 63/1416; H04L 63/14; H04L 63/1408
See application file for complete search history.

(56) References Cited

U.S. PATENT DOCUMENTS

2001/0017857 A1* 8/2001 Matsukawa ......... H04L 61/5076
370/392
2003/0028803 A1* 2/2003 Bunker, V .............. H04L 43/00
709/224

(Continued)

FOREIGN PATENT DOCUMENTS

CN 1848745 A 10/2006
CN 1997017 A 7/2007

(Continued)

OTHER PUBLICATIONS

State Intellectual Property Office of the People's Republic of China, Office Action and Search Report Issued in Application No. 202010053815.1, Oct. 9, 2021, 17 pages. (Submitted with Machine/Partial Translation).

(Continued)

*Primary Examiner* — Farid Homayounmehr
*Assistant Examiner* — Mudasiru K Olaegbe
(74) *Attorney, Agent, or Firm* — McCoy Russell LLP

(57) ABSTRACT

The present disclosure provides a method and apparatus for suppressing the spread of viruses in a local area network (LAN). The method includes, in response to that an ARP packet is received, determining whether a number of interacting terminals corresponding to a target terminal that sent the ARP packet reaches a first preset threshold; in response to that the number of interacting terminals reaches the first preset threshold, further determining whether a number of abnormal terminal relationships corresponding to the target terminal reaches a second preset threshold; and in response to that the number of abnormal terminal relationships reaches the second preset threshold, providing protection to the target terminal to so to suppress virus propagation in the LAN.

6 Claims, 7 Drawing Sheets

(56) References Cited

U.S. PATENT DOCUMENTS

| | | | |
|---|---|---|---|
| 2007/0150955 A1* | 6/2007 | Murase | H04L 63/1416 |
| | | | 726/23 |
| 2008/0189788 A1* | 8/2008 | Bahl | H04L 63/1416 |
| | | | 726/25 |
| 2009/0044276 A1* | 2/2009 | Abdel-Aziz | H04L 63/1425 |
| | | | 711/E12.091 |
| 2012/0278430 A1 | 11/2012 | Lehane et al. | |
| 2014/0325648 A1* | 10/2014 | Liu | H04L 63/1458 |
| | | | 726/22 |
| 2015/0121529 A1* | 4/2015 | Quinlan | H04W 12/121 |
| | | | 726/23 |
| 2015/0264081 A1* | 9/2015 | Lee | H04L 63/1466 |
| | | | 726/22 |
| 2018/0146417 A1* | 5/2018 | Qian | H04L 63/108 |
| 2019/0104127 A1* | 4/2019 | Da Silva Peixoto | |
| | | | H04L 63/0876 |

FOREIGN PATENT DOCUMENTS

| | | |
|---|---|---|
| CN | 102045366 A | 5/2011 |
| CN | 106790193 A | 5/2017 |
| CN | 109831462 A | 5/2019 |
| CN | 110266668 A | 9/2019 |

OTHER PUBLICATIONS

State Intellectual Property Office of the People's Republic of China, Office Action and Search Report Issued in Application No. 202010053815.1, May 7, 2022, 18 pages. (Submitted with Machine/Partial Translation).

* cited by examiner

SUPPRESSING VIRUS PROPAGATION IN A LOCAL AREA NETWORK

CROSS-REFERENCE OF RELATED APPLICATIONS

This application is a divisional application of U.S. patent application Ser. No. 17/151,032, entitled "SUPPRESSING VIRUS PROPAGATION IN A LOCAL AREA NETWORK", and filed on Jan. 15, 2021, which claims priority to Chinese Patent Application No. 202010053815.1 filed on Jan. 17, 2020. The entire contents of each of the above-listed applications are hereby incorporated by reference for all purposes.

TECHNICAL FIELD

The present disclosure relates to the field of computer technology, and in particular to methods and apparatuses for suppressing virus propagation in a local area network.

BACKGROUND

According to traditional network construction concept, a local area network (LAN) is independent of the Internet and has no security risks. Therefore, in the process of building information security, focus has long been given to threats from the Internet and from junctures between networks, and the security of the LAN has been ignored, making it a weak link in the entire network.

LAN having weak protection provides a convenient environment for the spread of viruses. Accordingly, a method for suppressing virus propagation in the LAN is desired.

SUMMARY

In view of this, the present disclosure provides a method for suppressing the spread of viruses in a local area network, applicable to a forwarding device, the method including: in response to receiving an address resolution protocol (ARP) packet initiated by a target terminal, determining whether a number of interacting terminals in the LAN that have perform ARP interaction with the target terminal reaches a first preset threshold; in response to that the number of interacting terminals reaches the first preset threshold, determining whether a number of abnormal terminal relationships corresponding to the target terminal reaches a second preset threshold, wherein for one of the number of abnormal terminal relationships, the target terminal performs interaction with other terminal in the LAN by sending a first service packet of which a destination port belongs to preset risky ports, and the first service packet corresponds to a service packet sent to the other terminal by the target terminal immediately after acquiring a media access control (MAC) address of the other terminal by performing the ARP interaction with the other terminal; and in response to that the number of abnormal terminal relationships reaches the second preset threshold, providing protection to the target terminal so to suppress virus propagation in the LAN.

The present disclosure provides a method for suppressing the spread of viruses in a LAN, applicable to a forwarding device, the method including: in response to receiving a first service packet initiated by a target terminal, determining whether a number of abnormal terminal relationships corresponding to the target terminal in a LAN reaches a first preset threshold, wherein the first service packet corresponds to a first one of service packets sent to other terminal by the target terminal immediately after acquiring a MAC address of the other terminal by performing the ARP interaction with the other terminal, and for one of the number of abnormal terminal relationships, the target terminal performs interaction with a second terminal in the LAN by sending a first service packet with a destination port which belongs to preset risky ports; in response to that the number of abnormal terminal relationships reaches the first preset threshold, determining whether a number of interacting terminals in the LAN that have performed ARP interaction with the target terminal reaches a second preset threshold; and in response to that the number of interacting terminals reaches the second preset threshold, providing protection to the target terminal so to suppress virus propagation in the LAN.

According to the solution described herein, the pattern of a terminal interacting with other terminals in the LAN can be analyzed to determine whether it matches the pattern of virus propagation, and when the pattern of the terminal interacting matches the pattern of virus propagation, protection to the terminal is provided. Therefore, in one aspect, by using the methods and apparatuses described herein, various viruses are suppressed from propagating in a LAN without relying upon any existing virus signatures such as virus database or threat intelligence; in another aspect, forwarding devices in LANs are endowed with the ability to suppress virus propagation without additional security protection devices.

DETAILED DESCRIPTION

Exemplary embodiments will be described in detail below, examples of which are shown in the accompanying drawings. When drawings are involved, unless otherwise indicated, like numerals in different drawings represent the same or similar elements. The embodiments described in the following exemplary embodiments do not represent all embodiments consistent with the present disclosure. In contrast, they are merely examples of devices and methods consistent with some aspects of the present disclosure as detailed in the appended claims.

The terminology used in the present disclosure is for the purpose of describing particular embodiments only, and is not intended to limit the present disclosure. Terms in singular forms and modified by "a", "the", and "said" in the present disclosure and the appended claims are also intended to indicate plurality unless the context clearly indicates otherwise. It should also be understood that "and/or" as used herein refers to and includes any or all possible combinations of one or more associated listed items.

It should be understood that although "first", "second", "third", etc. may be used herein to describe various information, the information should not be limited to these terms. These terms are used merely to distinguish information of a same type from each other. For example, without departing from the scope of the present disclosure, a first information may also be referred to a second information, and similarly, the second information may also be referred to the first information. Depending on the context, the word "if" as used herein may be interpreted as "when" or "upon" or "in response to determining".

According to related technology, network engineers generally use forwarding devices to construct a LAN. When a network engineer is asked to construct a network, he/she may use forwarding devices such as switches or routers to connect terminals that need to be connected in the same LAN, so that the terminals can access each other via the forwarding devices. After the LAN is set up, if terminals in the LAN needs to access external network resources, the network engineer may connect a gateway to the forwarding devices, so that the terminals in the LAN can access the external network resources through the gateway.

Figure 1:
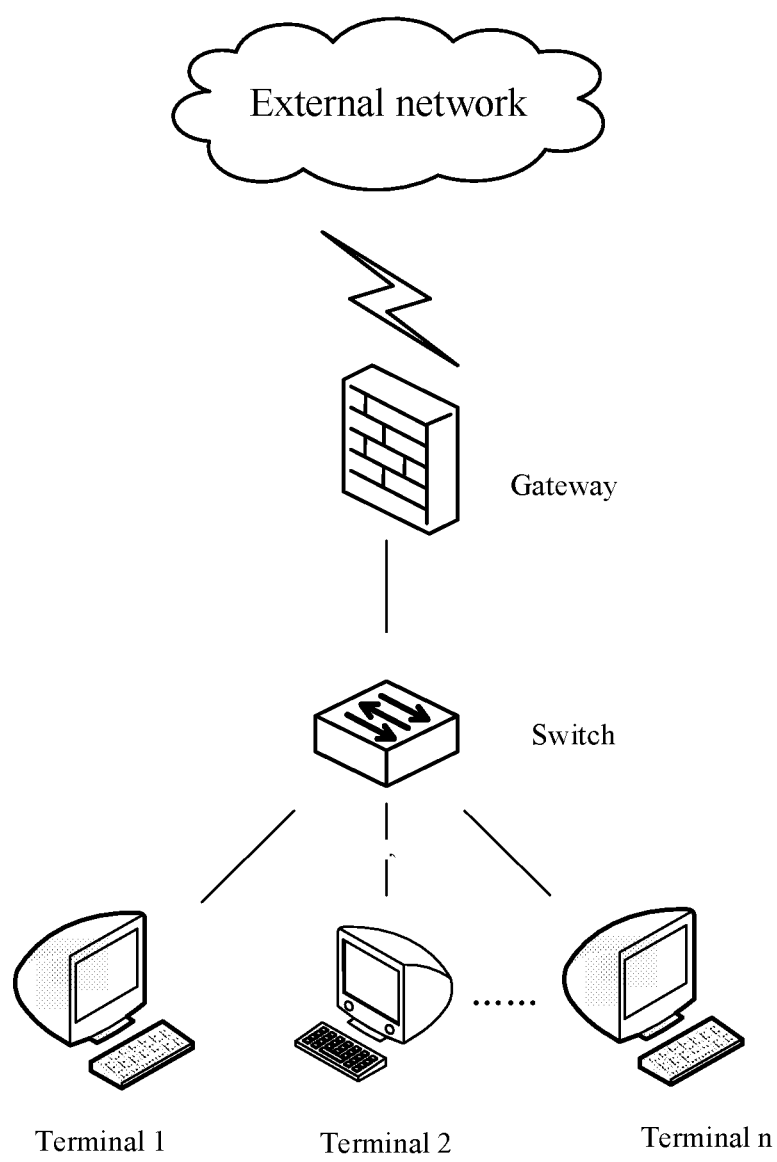
FIG. 1 is a schematic diagram illustrating a network according to embodiments of the present disclosure.

FIG. 1 is a schematic diagram illustrating a network according to embodiments of the present disclosure. As shown in FIG. 1, a gateway is connected to an external network; a switch and a LAN composed of terminals connected to the switch are connected to the gateway; terminals in the LAN can access the external network resources through the gateway.

According to the network structure shown in FIG. 1, if terminal 1 contracts a virus (e.g., the ransomware Eternal-Blue, hereinafter refers to the virus), other terminals in the LAN may soon contract the same virus.

For example, when propagating, the virus may first obtain a subnet indicated by an Internet protocol (IP) address of the LAN where the virus-host (terminal 1) is located, and then create multiple threads in a short time to rapidly infect all target hosts (terminal 2 to terminal n) within the subnet.

When initializing a thread to infect a target host, the virus may search for the media access control (MAC) address of the target host in a cached ARP table (a table of correspondences between IP addresses and MAC addresses) maintained by terminal 1 based on the IP address of the target host. After obtaining the MAC address of the target host, the virus can send a connecting request to the target host through terminal 1 to establish connection with the target host. When connection is established between the target host and terminal 1, the virus may scan for vulnerabilities (e.g., MS17-010) in the target host through vulnerable ports (e.g., port 445) of the target host and infect the target host by exploiting the scanned vulnerabilities.

If the MAC address of the target host is not stored in the cached ARP table, the virus can send an APR request to the target host through terminal 1 to obtain the MAC address of the target host. After obtaining the MAC addresses of the target host, the virus can send a service packet (e.g., a transmission control protocol (TCP) packet or a user datagram protocol (UDP) packet) carrying a connecting request to the target host through terminal 1 to establish connection with the target host. When connection is established between the target host and terminal 1, the virus may scan for vulnerabilities (e.g., MS17-010) in the target host through vulnerable ports (e.g., port 445) of the target host and infect the target host by exploiting the scanned vulnerabilities. As such, once one of the terminals in the LAN contracts the virus, other terminals in the LAN will soon be infected.

In some examples, in order to suppress virus propagation in the LAN, a network engineer may deploy network security devices in the LAN or deploy anti-virus software on the terminals in the LAN when constructing the LAN.

According to the network topology shown in FIG. 1, when terminal 1 (the infected terminal) is infecting other terminals, the network security device and the antivirus software can identify the infection behavior of the virus based on existing virus database or threat intelligence, so as to effectively suppress virus propagation in the LAN.

The virus propagation may be suppressed by using the above method, however, since the network security device identifies the spread of the virus based on existing virus database or threat intelligence, once the variants of the virus emerge, they cannot be identified by the network security device.

In view of above, the present disclosure provides a method for suppressing the spread of viruses in a LAN, applicable to a forwarding device. This method identifies the spread of viruses by establishing an identification model and protects the identified viruses from propagating, thereby effectively suppressing the spread of various viruses in LANs.

For example, in response to receiving an ARP packet, whether a number of interacting terminals among terminals included in the LAN that have performed ARP interaction with a target terminal that initiated the ARP packet reaches a first preset threshold.

If the number of interacting terminals reaches the first preset threshold, whether a number of abnormal terminal relationships corresponding to the target terminal reaches a second preset threshold is further determined. For one of the number of abnormal terminal relationships, the target terminal performs interaction with other terminal in the LAN by sending a first service packet of which a destination port belongs to preset risky ports. As for the first service packet, a first one of service packets sent to the other terminal by the target terminal immediately after acquiring a MAC address of the other terminal by performing the ARP interaction with the other terminal.

If the number of abnormal terminal relationships reaches the second preset threshold, protection is provided to the target terminal so to suppress virus propagation in the LAN.

The present disclosure also provides a method for suppressing the spread of viruses in a LAN, applicable to a forwarding device.

For example, in response to that the first service packet is received, whether a number of abnormal terminal relationships corresponding to a target terminal that initiated the first service packet reaches a first preset threshold. As for the first service packet, a first one of service packets sent to other terminal by the target terminal immediately after acquiring a MAC address of the other terminal by performing the ARP interaction with the other terminal. For one of the number of abnormal terminal relationships, the target terminal performs interaction with other terminal in the LAN by sending a first service packet of which a destination port belongs to preset risky ports.

If the number of abnormal terminal relationships reaches the first preset threshold, whether a number of interacting terminals in the LAN that have performed ARP interaction with the target terminal reaches a second preset threshold is further determined.

If the number of interacting terminals reaches the second preset threshold, protection is provided to the target terminal so to suppress virus propagation in the LAN.

The present disclosure also provides a method for suppressing the spread of viruses in a LAN, applicable to a forwarding device.

For example, in response to that an ARP packet is received, whether a number of first interacting terminals that have performed ARP interaction with a first target terminal that initiated the ARP packet reaches a first preset threshold among terminals included in the LAN.

If the number of first interacting terminals reaches the first preset threshold, it is determined that whether a number of first abnormal terminal relationships maintained by a forwarding device reaches a second preset threshold. For one of the number of first abnormal terminal relationships, the first target terminal performs interaction with other terminal in the LAN by sending a first service packet of which a destination port belongs to preset risky ports. The first service packet is a first one of service packets sent to other terminal by the target terminal immediately after acquiring a MAC address of the other terminal by performing the ARP interaction with the other terminal.

If the number of abnormal terminal relationships reaches the second preset threshold, protection is provided to the first target terminal so to suppress virus propagation in the LAN.

In response to that the first service packet is received, it is determined that whether a number of second abnormal terminal relationships corresponding to a second target terminal that initiated the first service packet reaches a third preset threshold. For one of the number of second abnormal terminal relationships, the second target terminal performs interaction with other terminal in the LAN by sending a first service packet of which a destination port belongs to preset risky ports.

If the number of second abnormal terminal relationships reaches the third preset threshold, it is determined that whether a number of second interacting terminals that have performed ARP interaction with the second target terminal among the terminals included in the LAN reaches a fourth preset threshold.

If the number of second interacting terminals reaches the fourth preset threshold, protection is provided to the second target terminal so to suppress virus propagation in the LAN.

In the methods of the present disclosure, whether the interaction behavior of a target terminal with other terminals in a LAN matches a pattern of virus propagation may be analyzed, and provide protection to the target terminal when the interaction behavior of the target terminal matches the pattern of virus propagation. Therefore, in one aspect of the present disclosure, various viruses are suppressed from propagating in a LAN without relying upon any existing virus signatures such as virus database or threat intelligence; in another aspect, forwarding devices in LANs are endowed with the ability to suppress the spread of viruses without additional security protection devices.

The present disclosure will be described in detail below in combination with embodiments.

Figure 2:
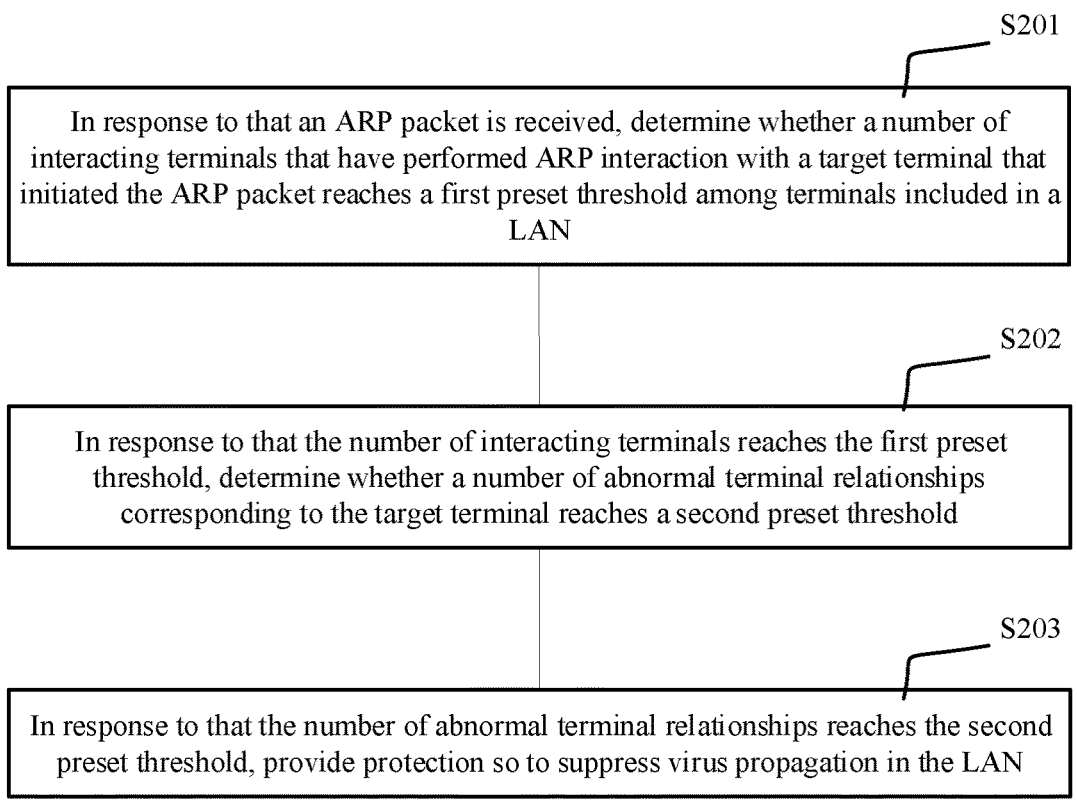
FIG. 2 is a flowchart illustrating a method for suppressing the spread of viruses in a LAN according to embodiments of the present disclosure.

FIG. 2 is a flowchart illustrating a method for suppressing the spread of viruses in a LAN according to embodiments of the present disclosure. The method is applicable to a forwarding device, and may include steps S201-S203.

At step S201, in response to receiving an ARP packet initiated by a target terminal, it is determined that whether a number of interacting terminals in the LAN that have perform ARP interaction with the target terminal reaches a first preset threshold.

At step S202, in response to that the number of interacting terminals reaches the first preset threshold, it is further determined that whether a number of abnormal terminal relationships corresponding to the target terminal reaches a second preset threshold. For one of the number of abnormal terminal relationships, the target terminal performs interaction with other terminal in the LAN by sending a first service packet of which a destination port belongs to preset risky ports. The first service packet is a first one of service packets sent to other terminal by the target terminal immediately after acquiring a MAC address of the other terminal by performing the ARP interaction with the other terminal.

At step S203, in response to that the number of abnormal terminal relationships reaches the second preset threshold, protection is provided to the target terminal so to suppress virus propagation in the LAN.

Specifically, the forwarding device is a network device that forwards packets in a LAN, e.g., a switch, a router, a HUB, etc.

The target terminal may be any terminal in the LAN.

For example, the ARP packet may be an ARP request packet and/or an ARP response packet. The number of interacting terminals may be updated based on the ARP packet, which makes the number of interacting terminals more accurately counted. For example, when an ARP response packet or an ARP request packet from terminal 1 in the LAN is received, the switch can determine an opposite terminal that is carrying out ARP interaction with terminal 1 according to the destination IP address carried in the ARP response packet or the ARP request packet. After determining the opposite terminal, the switch can update the number of interacting terminals accordingly, so that the number of interacting terminals is more accurately counted than being updated only after the switch receives the ARP request packet.

After the target terminal has initiated an ARP packet and performed ARP interaction with at least one of the other terminals in the LAN, whether any of the other terminals has performed ARP interaction with the target terminal can be determined. If yes, the number of interacting terminals is updated. If not, the number of interacting terminals is not updated. In this way, the number of terminals that have performed ARP interaction with the target terminal can be accurately counted (steps of determining whether any of the other terminals has performed ARP interaction with the target terminal will be described in detail below).

In an example, the number of abnormal terminal relationships may be counted via a field of abnormal terminal relationships. For example, a terminal entry corresponding to the target terminal may be maintained in the forwarding device, and a field of abnormal terminal relationships is maintained in the terminal entry. Whenever the forwarding device receives a first service packet sent by the target terminal with the preset risk port (e.g., 135, 139, 445, 3389) as the destination port, the field of abnormal terminal relationships is updated.

Refer back to FIG. 1, assuming that the method shown in FIG. 2 applied in the switch shown in FIG. 1.

In this case, after receiving an ARP packet sent by terminal 1, the switch can determine whether a number of terminals that have performed ARP interaction with the target terminal reaches a first preset threshold among the terminals included in the LAN. If it is true, the switch further determines whether a number of abnormal terminal relationships corresponding to the target terminal reaches a second preset threshold. If this is also true, the switch may determine that terminal 1 is propagating a virus and restricting interaction between terminal 1 and other terminals.

It should be noted that the step of determining whether the number of interacting terminals reaches the first preset threshold can be triggered not only by the reception of an ARP packet, but also be automatically and periodically triggered, or be triggered by the reception of any type of packet.

Figure 3:
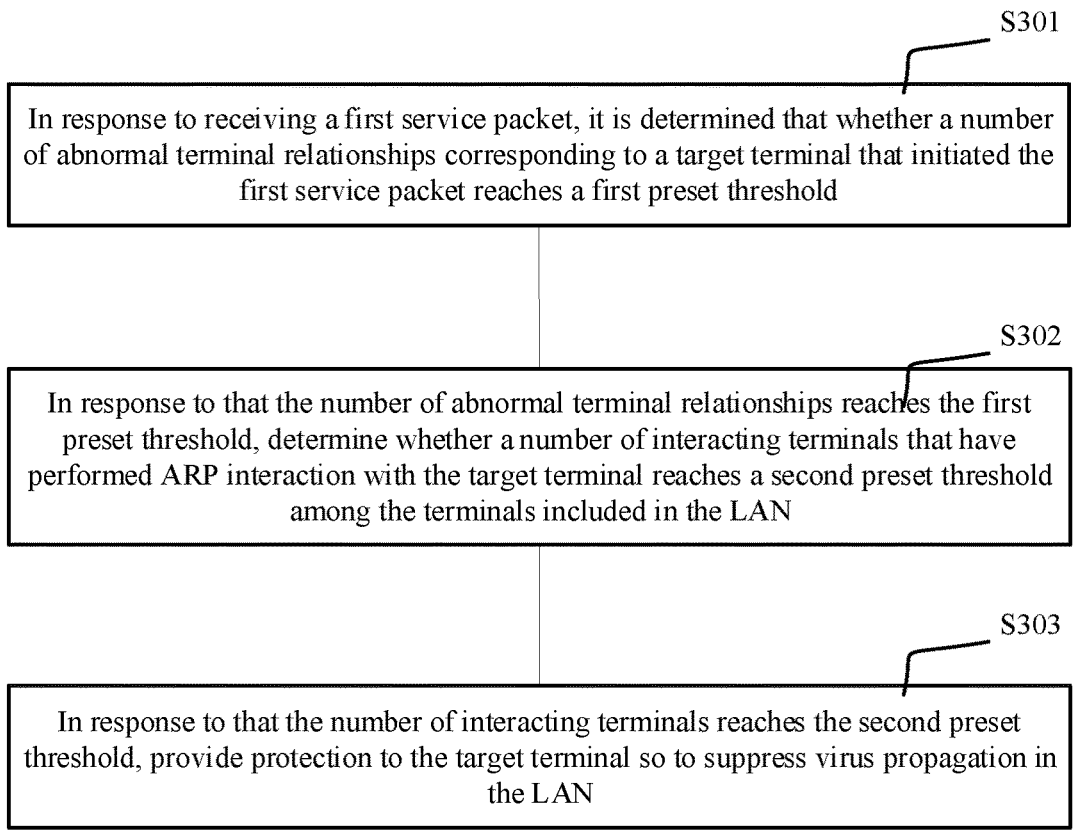
FIG. 3 is a flowchart illustrating a method for suppressing the spread of viruses in a LAN according to embodiments of the present disclosure.

FIG. 3 is a flowchart illustrating a method for suppressing the spread of viruses in a LAN according to embodiments of the present disclosure. The method is applicable to a forwarding device, and may include steps S301-S303.

At step S301, in response to receiving a first service packet, it is determined that whether a number of abnormal terminal relationships corresponding to a target terminal that initiated the first service packet reaches a first preset threshold. The first service packet is a first one of service packets sent to other terminal by the target terminal immediately after acquiring a MAC address of the other terminal by performing the ARP interaction with the other terminal. The service packets may include one or more of a TCP packet, a UDP packet and other types of service packets. For one of the number of abnormal terminal relationships, the target terminal performs interaction with other terminal in the LAN by sending a first service packet of which a destination port belongs to preset risky ports.

At step S302, in response to that the number of abnormal terminal relationships reaches the first preset threshold, it is further determined that whether a number of interacting terminals that have performed ARP interaction with the target terminal reaches a second preset threshold among the terminals included in the LAN.

At step S303, in response to that the number of interacting terminals reaches the second preset threshold, protection is provided to the target terminal so to suppress virus propagation in the LAN.

Refer back to FIG. 1, assuming that the method shown in FIG. 3 is applied in the switch shown in FIG. 1.

In this case, after a first service packet sent by terminal 1 is received, the switch can obtain a source port carried in the first service packet by parsing the first service packet and determine whether a number of abnormal terminal relationships corresponding to a respective source port of a target terminal reaches a first preset threshold. If it is true, the switch further determines whether a number of interacting terminals corresponding to the target terminal reaches a second preset threshold. If this is also true, the switch may determine that terminal 1 is propagating a virus and limiting interaction between terminal 1 and other terminals.

It should be noted that the step of determining whether the number of abnormal terminal relationships reaches the first preset threshold can be triggered not only by the reception of a first service packet, but also be automatically and periodically triggered, or be triggered by the reception of a packet of any type.

Figure 4:
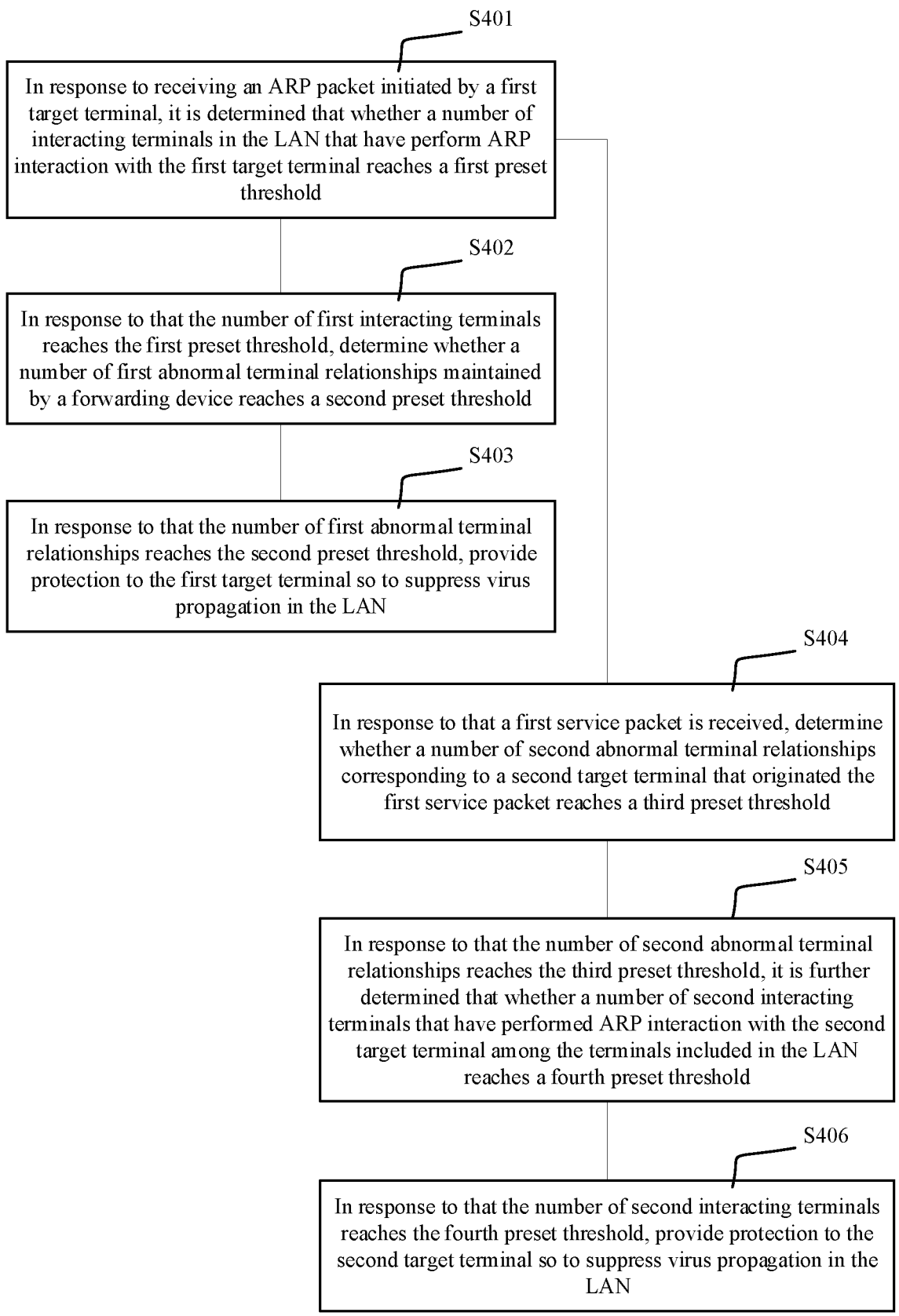
FIG. 4 is a flowchart illustrating a method for suppressing the spread of viruses in a LAN according to embodiments of the present disclosure.

FIG. 4 is a flowchart illustrating a method for suppressing the spread of viruses in a LAN according to embodiments of the present disclosure. The method can be applied in a forwarding device, and may include steps S401-S406.

At step S401, in response to receiving an ARP packet initiated by a first target terminal, it is determined that whether a number of interacting terminals in the LAN that have perform ARP interaction with the first target terminal reaches a first preset threshold.

At step S402, in response to that the number of first interacting terminals reaches the first preset threshold, it is further determined whether a number of first abnormal terminal relationships maintained by a forwarding device reaches a second preset threshold. For one of the number of first abnormal terminal relationships, the first target terminal performs interaction with other terminal in the LAN by sending a first service packet of which a destination port belongs to preset risky ports. The first service packet is a first one of service packets sent to other terminal by the target terminal immediately after acquiring a MAC address of the other terminal by performing the ARP interaction with the other terminal.

At step S403, in response to that the number of first abnormal terminal relationships reaches the second preset threshold, protection is provided to the first target terminal so to suppress virus propagation in the LAN.

At step S404, in response to receiving the first service packet, it is determined whether a number of second abnormal terminal relationships corresponding to a second target terminal that initiated the first service packet reaches a third preset threshold. For one of the number of second abnormal terminal relationships, the second target terminal performs interaction with other terminal in the LAN by sending a first service packet of which a destination port belongs to preset risky ports.

At step S405, in response to that the number of second abnormal terminal relationships reaches the third preset threshold, it is further determined that whether a number of second interacting terminals that have performed ARP interaction with the second target terminal among the terminals included in the LAN reaches a fourth preset threshold.

At step S406, in response to that the number of second interacting terminals reaches the fourth preset threshold, protection is provided to the second target terminal so to suppress virus propagation in the LAN.

According to the above embodiments, since two methods for identifying the spread of viruses may be applied in the forwarding device at the same time, when the forwarding device identifies the spread of viruses using any of the methods, the virus propagation can be suppressed in the LAN, thereby improving the identification rate for the spread of viruses.

In some embodiments of the present disclosure, in order to accurately count a number of interacting terminals that have performed ARP interaction with a target terminal among the terminals included in the LAN. A list with host address as indexes to the list items can be used as a statistical tool.

In an example, in response to that an ARP packet is received, the switch can update the number of interacting terminals. For example, in response to that an ARP packet is received, the switch can determine a subnet mask corresponding to the subnet of the destination IP address carried in the ARP packet, and determine the corresponding host address based on the subnet mask. After obtaining the host address, the switch can determine a to-be-updated list entry corresponding to the host address, and accordingly update the to-be-updated list entry. Those skilled in the art can understand that a list like an array, a bitmap, etc. may also be used as the statistical tool described above.

In some embodiments of the present disclosure, a bitmap may be used to count the number of interacting terminals mentioned above.

In an example, indexes to identifier bits of the bitmap can be set as host address. When an ARP packet is received, the corresponding identifier bit is determined according to the host address indicated by the destination IP address carried in the ARP packet and set accordingly. It should be noted that in this step, if the identifier bit has already been set, the setting state of the identifier bit may be retained without performing the setting operation.

Table 1 illustrates an example of the bitmap according to the present disclosure. As shown in Table 1, the indexes to the identifier bits of the bitmap are host address 0-255, and an identifier bit of 0 indicates a non-set state while an identifier bit of 1 indicates a set state.

TABLE 1

| 0 | 1 | 2 | 3 | 4 | 5 | ... | 255 |
|---|---|---|---|---|---|-----|-----|
| 0 | 0 | 0 | 0 | 0 | 0 | ... | 0   |

Assume that the bitmap shown in Table 1 is maintained in a switch. When an ARP packet is received, the switch can determine the destination IP address (assuming as "192.168.1.5") carried in the ARP packet and the subnet mask (assuming as "255.255.255.0") of the destination IP address. Then the switch can determine the host address indicated by the destination IP address "192.168.1.5" is 5 (i.e. a decimal value of the last 8 digits of the destination IP address) based on the subnet mask "255.255.255.0". Then the switch searches for the corresponding identifier bit in the bitmap based on the host address "5", and set the identifier bit as 1. It should be noted that in this step, if the identifier bit has already been set, it indicates that the terminal corresponding to the destination IP address has performed ARP interaction with the target terminal that initiated the ARP packet, the setting state of the identifier bit can thus be retained without performing repeated setting operations.

The resulting bitmap after being processed according to the above steps is shown in Table 2.

TABLE 2

| 0 | 1 | 2 | 3 | 4 | 5 | ... | 255 |
|---|---|---|---|---|---|-----|-----|
| 0 | 0 | 0 | 0 | 0 | 1 | ... | 0   |

Below is a detailed description of this embodiment with reference to the scenario shown in FIG. 1.

Figure 5:
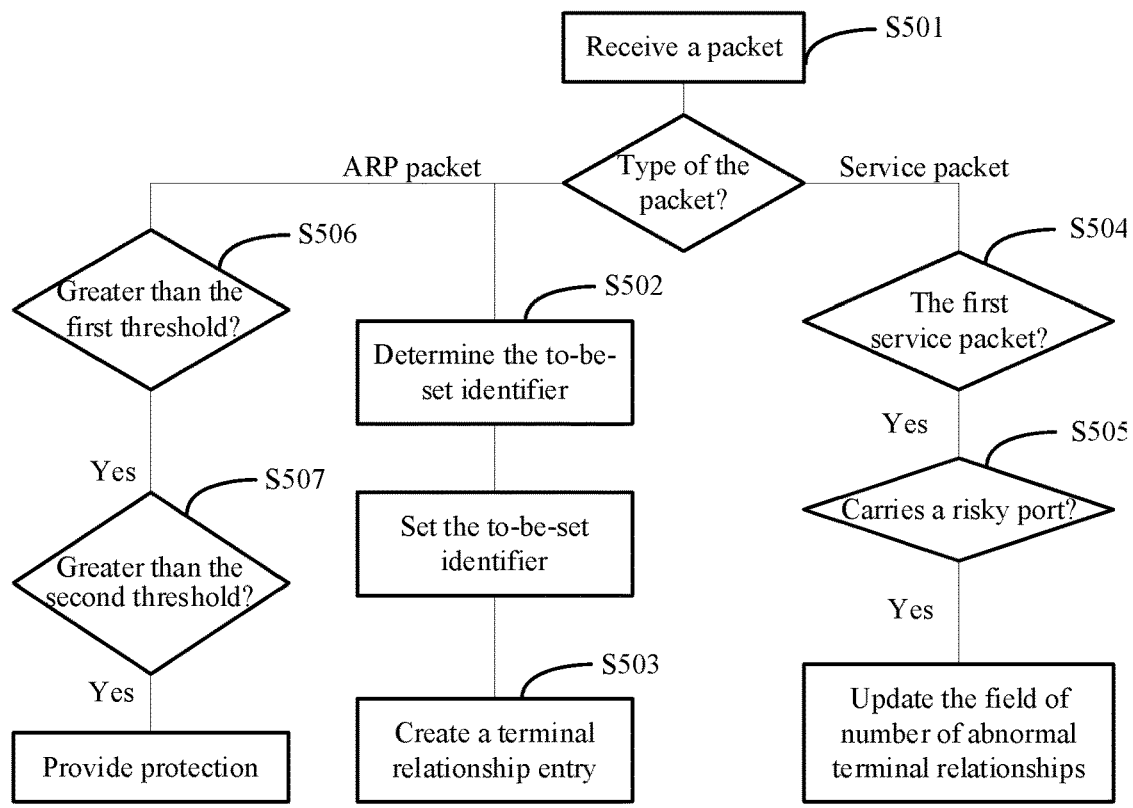
FIG. 5 is a flowchart illustrating a method for suppressing the spread of viruses in a LAN according to embodiments of the present disclosure.

FIG. 5 is a flowchart illustrating a method for suppressing the spread of viruses in a LAN according to embodiments of the present disclosure, which may be executed by a control unit in the switch, e.g., a central processing unit (CPU), a field programmable gate array (FPGA), etc.

As shown in FIG. 5, at step S501, any traffic packet sent by a target terminal in a LAN is received, a source IP address carried in the traffic packet is obtained, and a terminal entry corresponding to the target terminal is created based on the source IP address. The terminal entry may include an IP address field indicating the source IP address of the target terminal, a bitmap pointer, a time field indicating when the bitmap is first set, a terminal relationship table pointer, and a field of a number of abnormal terminal relationships. It should be noted here that the terminal entry may be adjusted to include or exclude certain elements as required. For example, the field of a number of abnormal terminal relationships may not include the number of abnormal terminal relationships if the number of abnormal terminal relationships is not required to be counted. As another example, since the IP address of the terminal is subject to variation, in order to correspond the terminal entry to a unique terminal, the terminal entry may be created based on both the source IP address and the source MAC address carried in the traffic packet.

The bitmap pointer may point to a bitmap maintained by the switch for the target terminal.

The time field indicating when the bitmap was first set may record a time indicated by the time stamp when the bitmap is first set. The time field indicating when the bitmap is first set can be used as a reference for aging the above bitmap.

The terminal relationship table pointer may point to a terminal relationship table maintained by the switch for the target terminal.

The terminal relationship table may include several terminal relationship entries, which may include a destination IP address field, a service identifier, and an abnormal relationship identifier. The destination IP address field indicates the destination IP address carried in the ARP packet sent by the target terminal; the service identifier may indicate whether the service packet after the target terminal start sending ARP packets is the first service packet; and the abnormal relationship identifier indicates, if the service packet is the first service packet, whether the destination port carried in the first service packet indicates a preset risky port (e.g., 135, 139, 445, 3389).

The field of a number of abnormal terminal relationships indicates the number of abnormal terminal relationships maintained by the switch. For one of the number of abnormal terminal relationships, the terminal (that is, the target terminal) performs interaction with other terminal in the LAN by sending a first service packet with a destination port which is the preset risky port (e.g., 135, 139, 445, 3389).

In an example, after the terminal entry corresponding to the target terminal is created, the terminal entry may be initialized. For example, the following operations can be performed: setting the IP address field in the terminal entry to the source IP address of any traffic packet; generating the bitmap shown in Table 1 in the switch and the bitmap pointer is added to the terminal entry; initializing the time field indicating when the bitmap is first set to 0; maintaining the terminal relationship table corresponding to the target terminal in the switch, and the terminal relationship table may be initialized as empty by default; and initializing the field of the number of abnormal terminal relationships to 0.

As shown in FIG. 5, after the any traffic packet sent by the terminal in the LAN is received, the type of the traffic packet can be determined first. If the traffic packet is an ARP packet, the source IP address of the ARP packet can be obtained, and the corresponding terminal entry can be searched for based on the source IP address.

After the terminal entry is searched out, in an example, whether the time field indicating when the bitmap is first set included in the terminal entry is set to 0 can be determined. If so, the time field indicating when the bitmap is first set is updated to the current time; if not, no operation on the time field indicating when the bitmap is first set may be performed.

After the terminal entry is searched out, the corresponding bitmap can be determined based on the bitmap pointer included in the terminal entry, and then the to-be-set identifier bit is determined (step S502) and set according to the host address indicated by the destination IP address carried in the ARP packet.

Upon determining the host address indicated by the destination IP address, if the switch can obtain the subnet mask of the destination IP address, then the host address indicated by the destination IP address can be directly determined based on the subnet mask; if the switch cannot directly obtain the subnet mask of the destination IP address, the following method may be performed: assuming a subnet mask of the destination IP address, and determining whether the destination IP address and the source IP address carried in the ARP packet indicate a same subnet according to the assumed subnet mask. If the destination IP address and the source IP address indicate the same subnet, the assumed subnet mask is determined as the subnet mask of the destination IP address; if the destination IP address and the source IP address do not indicate the same subnet, assuming another subnet and then repeating the above steps, until determining the destination IP address and the source IP address indicate the same subnet according to a certain proposed subnet mask, and determining the assumed subnet mask as the subnet mask of the destination IP address.

In an example, the following steps can be performed. First, assume the subnet mask is a 24-bit subnet mask (i.e., 255.255.255.0). Then, perform logic operations "AND" on the 24-bit subnet mask, and the source IP address and the destination IP address, respectively; and determine whether the operation results are identical. If so, determine that the source IP address and the destination IP address indicate the same subnet; if not, determine that the source IP address and the destination IP address do not indicate the same subnet. If the destination IP address and the source IP address indicate the same subnet, determine that the subnet mask of the destination IP address is a 24-bit subnet mask; if the destination IP address and the source IP address do not indicate the same subnet, assume again the subnet mask is a 16-bit subnet mask (i.e., 255.255.0.0), and repeat the above operations. If the destination IP address and the source IP address indicate the same subnet, determine that the subnet mask of the destination IP address is a 16-bit subnet mask; if the destination IP address and the source IP address do not indicate the same subnet, assume again the subnet mask is an 8-bit subnet mask (i.e., 255.0.0.0), and repeat the above operations. If the destination IP address and the source IP address indicate the same subnet, determine that the subnet mask of the destination IP address is an 8-bit subnet mask.

In this case, assuming the subnet mask of the destination IP address is a 24-bit subnet mask, the host address indicated by the destination IP address can be determined as decimal values of the last 8 bits in the destination IP address, and the to-be-set identifier bit corresponding to the host address can be set.

It should be noted that if the identifier bit has already been set, which indicates the terminal corresponding to the destination IP address has performed ARP interaction with the target terminal that initiated the ARP packet, the state of the to-be-set identifier bit can be retained without performing the setting operation.

In this way, a bitmap, which occupies small storage space, can be used to count the number of terminals included in the LAN that have performed ARP interaction with the target terminal in the LAN, thereby saving storage space.

In order to save storage space, since network engineers generally do not use a subnet mask less than 8 bits in constructing a network. Therefore, in some examples, when the assumed subnet mask is an 8-bit subnet mast, and the destination IP address and the source IP address still do not indicate the same subnet, the ARP packet may not be processed to save the storage space.

Through the above steps, the number of terminals included in a LAN that have performed ARP interaction with the target terminal in the LAN can be counted accurately in the switch.

In the above embodiment, after setting at least one identifier bit in the bitmap, a terminal relationship table corresponding to the target terminal may be maintained.

For example at step S503, after setting the at least one identifier bit in the bitmap, a corresponding terminal relationship table may be determined according to a terminal relationship table pointer included in the terminal entry corresponding to the target terminal; and a terminal relationship entry corresponding to the destination IP address may be created in the terminal relationship table based on the destination IP address carried in the ARP packet.

In this step, the destination IP address field in the terminal relationship entry may be set to the destination IP address carried in the ARP packet; the service identifier in the terminal relationship entry may be set to 0 (assuming 0 represents that no first service message is received by the switch after the terminal relationship entry is created); and the abnormal relationship identifier in the terminal relationship entry may be set to 0 (assuming 0 represents normal).

After the terminal relationship entry is created, assuming that the switch receives a service packet (for example, a TCP packet) sent by the terminal, step S504 may be performed to further determine whether the service packet is the first service packet. For example, the switch may first determine the corresponding terminal relationship table according to the terminal relationship table pointer included in the terminal entry corresponding to the target terminal; then, based on the destination IP address carried in the service packet, search the terminal relationship table for the terminal relationship entry corresponding to the destination IP address carried in the service packet, and determine whether the service identifier included in the found terminal relationship table is 0 (for example, as a first preset identifier). If the service identifier is 0, the service packet may be determined as the first service packet, and the service identifier may be set to a non-zero value (e.g., 1); if the service identifier is not 0, the service packet may be determined as not the first service packet and the service packet may not be processed.

Assuming that the received service packet at step S504 is the first service packet, step S505 may be performed to further determine whether the destination port number carried in the first service packet indicates a preset risky port (e.g., 135, 139, 445, 3389). If so, the terminal relationship between the target terminal and a terminal whose IP address indicates the destination IP address is abnormal, the abnormal relationship identifier in the terminal relationship entry can be set to 1, and the field of the number of the abnormal terminal relationships can be increased by 1; if not, the service packet may not be processed.

Through the above steps, the number of interacting terminals corresponding to each terminal in the LAN and the number of abnormal terminal relationships can be counted in the switch.

In some cases, when an ARP packet sent by the target terminal is received, in addition to updating the number of interacting terminals corresponding to the target terminal, the switch may perform step S506, in which whether a number of interacting terminals corresponding to the target terminal that sent the ARP packet reaches a first preset threshold is determined by the switch. If it is true, the switch further performs step S507, in which whether a number of abnormal terminal relationships corresponding to the target terminal reaches a second preset threshold is determined by the switch. If this is also true, protection is provided to the target terminal so to suppress virus propagation in the LAN.

Upon performing step S506, whether the number of set identifier bits in the bitmap corresponding to the target terminal reaches the first preset threshold may be determined. If so, it can be determined that the number of terminals included in the LAN that have performed ARP interaction with the target terminal reaches the first preset threshold. Upon performing step S507, it can be determined that whether the value indicated by the field of the number of abnormal terminal relationships in the terminal entry corresponding to the target terminal reaches the second preset threshold. If so, interaction between the target terminal and each of the other terminals may be limited.

In some examples, an access control list (ACL) entry may be generated to restrict the risky terminal from interacting with other terminals. For example, if the IP address of the risky terminal is 10.1.1.1, the destination IP is 10.1.1.125, and the destination port number is a risky port with a port number of 445, an ACL entry with a matching condition of "10.1.1.1, 10.1.1.125, TCP, 445" and an operation condition of "discard" may be generated, so as to restrict the risky terminal from interacting with other terminals through the risky port.

In some examples, in order to identify the spread of viruses more accurately, whether the number of terminals with consecutive IP addresses among the terminals that have performed ARP interaction with the target terminal reaches a third preset threshold may be determined. If the number of terminals with consecutive IP addresses reaches the third preset threshold, protection is provided to the target terminal.

In an example, whether the number of set identifiers in the bitmap corresponding to the target terminal reaches the first preset threshold may be determined first. If it is true, whether the value indicated by the field of the number of abnormal terminal relationships in the terminal entry corresponding to the target terminal reaches the second preset threshold may be determined. If it is also true, whether the number of identifier bits that have been set consecutively among the set identifier bits in the bitmap reaches the third preset threshold may be determined. If this is still true, then protection is provided to the target terminal. It should be noted that the determination steps in the present disclosure may be performed in different sequences.

In this way, misidentifying normal accesses to the risky ports as the spread of viruses may be avoided, and the identification of the spread of viruses may be more accurate.

In some examples, in order not to allow the number of terminals included in the LAN that counted by the bitmap and have performed ARP interaction with the terminal increase infinitely, an aging mechanism is provided in the switch, which can periodically reset the identifier bits in the bitmap.

In some examples, the identifier bits in the bitmap may be reset periodically. For example, when any traffic packet sent by the target terminal is received, the switch determines whether the difference between a current time and a time field indicating when the bitmap was first set in the terminal entry corresponding to the source IP address of the packet is greater than a preset threshold (e.g., 30s). If so, the set identifier bits in the bitmap can be reset. It should be noted that, in some examples, the any traffic packet may be a packet of a specific type, for example, an ARP packet.

In an example, when the identifier bits in the bitmap are periodically reset, the terminal entry corresponding to the target terminal may also be initialized. For example, when the identifiers in the bitmap are periodically reset, the data in the terminal relationship table and related counting information can also be cleared.

In an example, in order to retain the number of abnormal terminal relationships counted in the current aging cycle to the next aging cycle, when identifier bits in the bitmap are periodically reset, among the terminal relationship entries corresponding to the target terminal, only identifier bits corresponding to a host address indicated by the destination IP addresses included in terminal relationship entries with abnormal relationship identifiers of other than 1 may be reset, and the abnormal relationship identifiers that have been set to 1 may be set to 2. For example, when the identifier bits in the bitmap are periodically reset, the abnormal relationship identifiers in the terminal relationship entries corresponding to the target terminal may be scanned first. If an abnormal relationship identifier is 1, then the identifier bit indicated by the host address indicated by the destination IP address in the terminal relationship entry to which the abnormal relationship identifier belongs is not reset, and the abnormal relationship identifier is set to 2; if an abnormal relationship identifier is not 1, then the identifier indicated by the host address indicated by the destination IP address in the terminal relationship entry to which the abnormal relationship identifier belongs is reset.

In this way, the number of abnormal terminal relationships counted in the current aging cycle is retained to the next aging cycle, thereby avoiding the influence of the previously-counted number of abnormal terminal relationships being aged on the identification of the spread of viruses in determining whether the number of terminals included in the LAN that have performed ARP interaction with the target terminal reaches a first preset threshold.

In some embodiments of the present disclosure, an array (e.g. an array entry) may be used to count the number of terminals included in the LAN that have performed ARP interaction with the target terminal.

In an example, indexes to elements in the array may be host address. The elements may include the contents stored in the terminal relationship entries, and the time when the elements were updated. For example, an element may be of 1 byte (8 bits), wherein 1 bit in the byte may represent the service identifier stored in the terminal relationship entry; 1 bit in the byte may represent the abnormal relationship identifier stored in the terminal relationship entry; and 6 bits in the byte may represent the time read as seconds when an element is updated. It should be noted that since 6 bits can count up to 64 ($2^6$), only the time read as seconds can be counted while using such 6 bits to record the time when an element is updated. If it is necessary to record time more accurately (with hours and minutes), the size of the element need to be expanded into larger bytes.

In this case, when an ARP packet is received, the switch can determine the corresponding element in the array based on the host address indicated by the destination IP address carried in the ARP packet, and update the element. In this step, if the element has already been updated, the update state of the element can be retained without performing any operation. It should be noted that when the element is updated, the bit representing the service identifier in a byte of the element can be initialized to 0, the bit representing the abnormal relationship identifier can be initialized to 0, and the 6 bits representing the time the element is updated can be set to the current time read as seconds.

Table 3 illustrates an example of the array. As shown in Table 3, the indexes to the elements of the array are host address 0-255, and an element of 0 (assuming the element is of 1 byte) indicates a not-updated state while an element of a non-zero value indicates an updated state.

TABLE 3

| 0 | 1 | 2 | ... | 255 |
|---|---|---|---|---|
| 00000000 | 00000000 | 00000000 | ... | 00000000 |

Assuming that the array shown in Table 3 is maintained in a switch, when an ARP packet is received, the destination IP address (assuming as "192.168.1.2") carried in the ARP packet and the subnet mask (assuming as "255.255.255.0") of destination IP address may be determined. Then, the host address "2" (i.e., the last 8 bits of decimal values in the destination IP address) indicated by the destination IP address "192.168.1.5" may be determined based on the subnet mask "255.255.255.0". Then the switch searches for the corresponding element in the array based on the host address "2", and initializes the bit representing the service identifier in the byte of the element to 0, initializes the bit representing the abnormal relationship identifier to 0, and sets the 6 bits representing the time the element is updated to the current time read as seconds (for example 7 corresponds to a binary value "111"). In this step, if the element has already been updated, which indicates the terminal corresponding to the destination IP address has performed ARP interaction with the target terminal that initiated the ARP packet, the state of the element can be retained without performing any operation. Referring to Table 4 for the result of the array in Table 3 being processed according to the above steps.

TABLE 4

| 0 | 1 | 2 | ... | 255 |
|---|---|---|---|---|
| 00000000 | 00000000 | 00000111 | ... | 00000000 |

Figure 6:
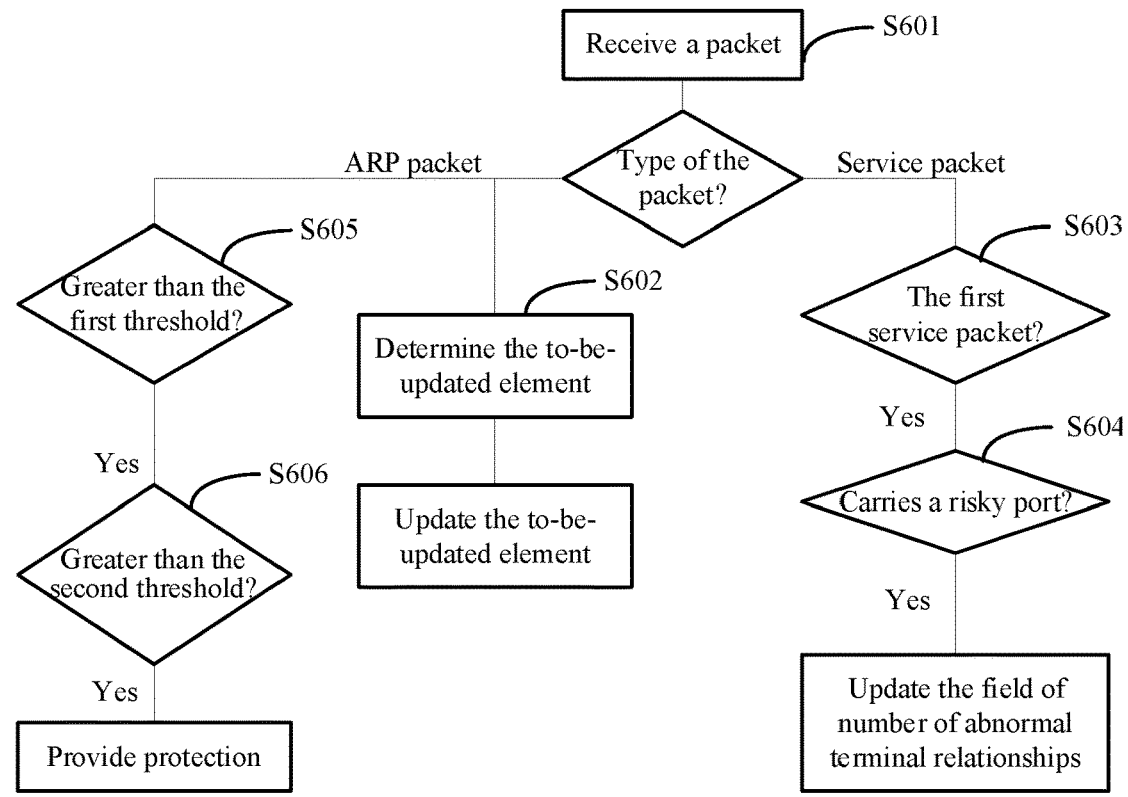
FIG. 6 is a flowchart illustrating a method for suppressing the spread of viruses in a LAN according to embodiments of the present disclosure.

FIG. 6 is a flowchart illustrating a method for suppressing the spread of viruses in a LAN according to embodiments the present disclosure. The method may be executed by the switch shown in FIG. 1. More specifically, the method may be executed by a control unit in the switch, e.g., CPU, FPGA, etc.

As shown in FIG. 6, at step S601, a traffic packet of any type sent by a target terminal in a LAN is received, a source IP address carried in the traffic packet is obtained, and a terminal entry corresponding to the target terminal is created based on the source IP address, wherein the terminal entry may include an IP address field indicating the source IP address of the terminal, an array pointer, and a field of a number of abnormal terminal relationships. It should be noted here that the terminal entry may be adjusted to include or exclude certain elements according to requirements. For example, the terminal entry may not include the field of a number of abnormal terminal relationships is not required to be counted. As another example, since the IP address of the terminal is subject to variation, in order to correspond the terminal entry to a unique terminal, the terminal entry may be created based on both the source IP address and the source MAC address carried in the traffic packet.

The array pointer may point to an array maintained by the switch for the target terminal. The array may include several elements. For example, the element may be of 1 byte (8 bits), where 1 bit in the byte may represent the service identifier stored in the terminal relationship entry of previous embodiments; 1 bit in the byte may represent the abnormal relationship identifier stored in the terminal relationship entry of previous embodiments; and 6 bits in the byte may represent the time when the elements were updated in seconds. The service identifier may indicate whether the service packet sent by the terminal after the ARP packet is a first service packet; and the abnormal relationship identifier indicates, if the service packet is the first service packet, whether the destination port number carried in the first service packet indicates a preset risky port (e.g., 135, 139, 445, 3389).

The field of a number of abnormal terminal relationships indicates the number of abnormal terminal relationships maintained by the switch. For one of the number of abnormal terminal relationships, the terminal (i.e. the target terminal) performs interaction with other terminal in the LAN by sending a first service packet with the preset risky port (e.g., 135, 139, 445, 3389) as the destination port.

In an example, after the terminal entry corresponding to the target terminal is created, the terminal entry may be initialized. For example, the following operations can be performed: setting the IP address field in the terminal entry to the source IP address of the traffic packet of any type; generating the array shown in Table 3 in the switch and adding the array pointer to the terminal entry; initializing elements of the array to 0; initializing the field of the number of abnormal terminal relationships is to 0.

As shown in FIG. 6, after receiving the traffic packet of any type sent from a terminal in the LAN, the type of the traffic packet can be determined first; if the traffic packet is an ARP packet, the source IP address of the ARP packet can be obtained, and the corresponding terminal entry can be searched based on the source IP address.

When the terminal entry is searched out, the corresponding array can be determined based on the array included in the terminal entry, and then the corresponding to-be-updated array element in the array is determined according to the host address indicated by the destination IP address carried in the ARP packet (step S602) and the corresponding to-be-updated array element is updated. Upon determining the host address in the destination IP address, if the switch can obtain the subnet mask of the destination IP address, then the host address indicated by the destination IP address can be directly determined based on the subnet mask; if the switch cannot directly obtain the subnet mask of the destination IP address, then the host address indicated by the destination IP address can be directly determined according to the previous method given in the present disclosure for determining the subnet mask of a destination IP address.

In this case, assuming that the subnet mask is a 24-bit subnet mask, the host address indicated by the destination IP address can be determined as a decimal value of the last 8 bits in the destination IP address, and the to-be-updated element corresponding to the host address in the array is updated.

It should be noted that, if the to-be-updated element has already been updated, which indicates the terminal corresponding to the destination IP address has performed ARP interaction with the target terminal that initiated the ARP packet, the state of the element may be retained without performing any other operation.

In this way, an array, which occupies small storage space, can be used to count the number of terminals included in the LAN that have performed ARP interaction with the target terminal in the LAN, thereby saving storage space.

Through the above steps, both the number of terminals included in the LAN that have performed ARP interaction with a target terminal in the LAN, and the time when each element in the array is updated can be recorded accurately in the switch. Therefore, each array element in an array can be aged and reset based on the time when the each array elements is updated, so as to more accurately count the number of terminals included in the LAN that have performed ARP interaction with the target terminal among the terminals in the LAN.

Assuming that the switch receives a service packet (for example, a TCP packet) sent by the target terminal, step S603 may be performed to determine whether the service packet is a first service packet. For example, the switch may first determine the corresponding terminal entry based on the source IP address carried in the service packet, then determine the corresponding array search the array for the element corresponding to the host address indicated by the destination IP address carried in the service packet, and determine whether the bit in the found element indicating the service identifier is 0 (as a first preset identifier). If the bit is 0, the service packet can be determined as the first service packet, and the bit can be set to a non-zero value (e.g., 1); if the bit is not 0, the service packet can be determined as not the first service packet and may not be processed.

Assuming that the received service packet determined at step S603 is the first service packet, step S604 can be performed to determine whether the destination port number carried in the first service packet indicates a preset risky port (e.g., 135, 139, 445, 3389). If so, the terminal relationship between the target terminal and a terminal indicated by the destination IP address is abnormal, the bit in the element representing the abnormal relationship identifier can be set to 1, and the field of the number of the abnormal terminal relationships can be increased by 1; if not, the service packet may not be processed.

Through the above steps, the number of interacting terminals corresponding to each terminal in the LAN and the number of abnormal terminal relationships can be counted in the switch.

In some cases, when the ARP packet sent by the target terminal is received, in addition to updating the number of interacting terminals corresponding to the target terminal, the switch can perform step S605, in which whether a number of interacting terminals corresponding to the target terminal that sent the ARP packet reaches a first preset threshold is determined by the switch. If it is true, the switch further performs step S606, in which whether the number of abnormal terminal relationships corresponding to the target terminal reaches a second preset threshold is determined by the switch. If this is also true, protection is provided to the terminal so to suppress virus propagation in the LAN.

Upon performing step S605, whether the number of updated elements in the array corresponding to the target terminal reaches the first preset threshold may be determined, and if so, it can be determined that the number of terminals included in the LAN that have performed ARP interaction with the target terminal reaches a first preset threshold among the terminals in the LAN. Upon performing step S606, it can be determined whether the value indicated by the field of the number of abnormal terminal relationships in the terminal entry corresponding to the target terminal reaches a second preset threshold, and if so, interaction between the target terminal and each of the other terminals is limited.

In some examples, an ACL entry may be generated to restrict the risky terminals from interacting with other terminals. For example, if the IP address of a risky terminal is 10.1.1.1, the IP address of the destination IP is 10.1.1.125, and the destination port number is a risky port with a port number of 445, an ACL entry with a matching condition of "10.1.1.1, 10.1.1.125, TCP, 445", and an operation condition of "discard" may be generated, so as to restrict the risky terminal from interacting with other terminals through the risky ports.

In some examples, in order to identify the spread of viruses more accurately, whether the number of terminals with consecutive IP addresses among the terminals that have performed ARP interaction with the target terminal reaches a third preset threshold may be determined. If the number of terminals with consecutive IP addresses reaches the third preset threshold, protection is provided to the target terminal.

In an example, whether a number of set identifiers in the bitmap corresponding to the target terminal reaches the first preset threshold may be determined. If it is true, whether the value indicated by the field of the number of abnormal terminal relationships in the terminal entry corresponding to the target terminal reaches the second preset threshold may be determined. If it is true, whether the number of elements that have been updated consecutively among the updated elements in the array reaches the third preset threshold may be determined. If this is also true, protection is provided to the target terminal. It should be noted that the determination steps in the present disclosure may be performed in different sequences.

In some examples, every element may be aged and reset based on the time when each element is updated, so as to more accurately count the number of terminals in a LAN that have performed ARP interaction with the target terminal among the terminals in the LAN.

For example, the time when each of the updated elements in the arrays corresponding to the terminal entries is updated may be scanned periodically, and whether the difference between a current time and the time when the element is updated is greater than a preset threshold can be determined. If so, the element is reset; if not, a state of the updated element is retained.

In an example, assuming that the elements in the array are of 1 byte, and 6 bits in the 1 byte represent the time when the element is updated in seconds, the aging mechanism may be:

a timing task configured in the switch to periodically scan the update time for each of the updated elements in arrays corresponding to the terminal entries, and calculate a difference (C) based on the current time read as seconds (A) and the time when the element is updated read as seconds (B), as shown below:

if A is less than or equal to B, then C=A+(60−B);

if A is greater than B, then C=A−B;

after the difference is obtained, it can be further determined whether the difference is greater than a preset threshold; if so, the element is reset to 0 (assuming 0 is the initial state); if not, the state of the updated element is retained.

In an example, when the elements in the array are periodically aged, related counts in the terminal entry can also be cleared.

In an example, in order to retain the number of abnormal terminal relationships counted in the current aging cycle to the next aging cycle, if at least 2 bits are used to represent the abnormal relationship identifier in an element, when the elements are being reset, only elements with an abnormal relationship identifier of other than 1 may be reset, and abnormal relationship identifiers that have been set to 1 may be reset to 2. For example, when the elements are being reset, whether the abnormal relationship identifiers in the elements are 1 can be determined first. If an abnormal relationship identifier in an element is 1, then the element is not reset, and the abnormal relationship identifier is reset to 2; if an abnormal relationship identifier is not 1, then the element is reset.

In this way, the number of abnormal terminal relationships counted in the current aging cycle is retained to the next aging cycle, thereby avoiding the influence of the previously-counted number of abnormal terminal relationships being aged on the identification of the spread of viruses in determining whether the number of terminals included in the LAN that have performed ARP interaction with the target terminal reaches a first preset threshold among the terminals in the LAN.

In some embodiments of the present disclosure, in order to save the storage space of the switch, when counting the number of terminals in a LAN that have performed ARP interaction with the target terminal among the terminals in the LAN, a field of a number of valid terminal relationship entries can be used in place of the bitmap and the array in the previous embodiments.

In an example, the field of the number of valid terminal relationship entries may represent a number of terminals in a LAN that have performed ARP interaction with a target terminal among the terminals in the LAN.

When an ARP packet from the terminal is received, it can be determined, based on the destination IP address carried in the ARP packet, whether a terminal relationship entry corresponding to the destination IP address has been created in the terminal entry corresponding to the target terminal. If not, the terminal relationship entry corresponding to the destination IP address can be created, and the field of the number of valid terminal relationship entries can be updated; if yes, it is indicated that the terminal corresponding to the destination IP address has performed ARP interaction with the target terminal that initiated the ARP packet, then no operation is performed.

Figure 7:
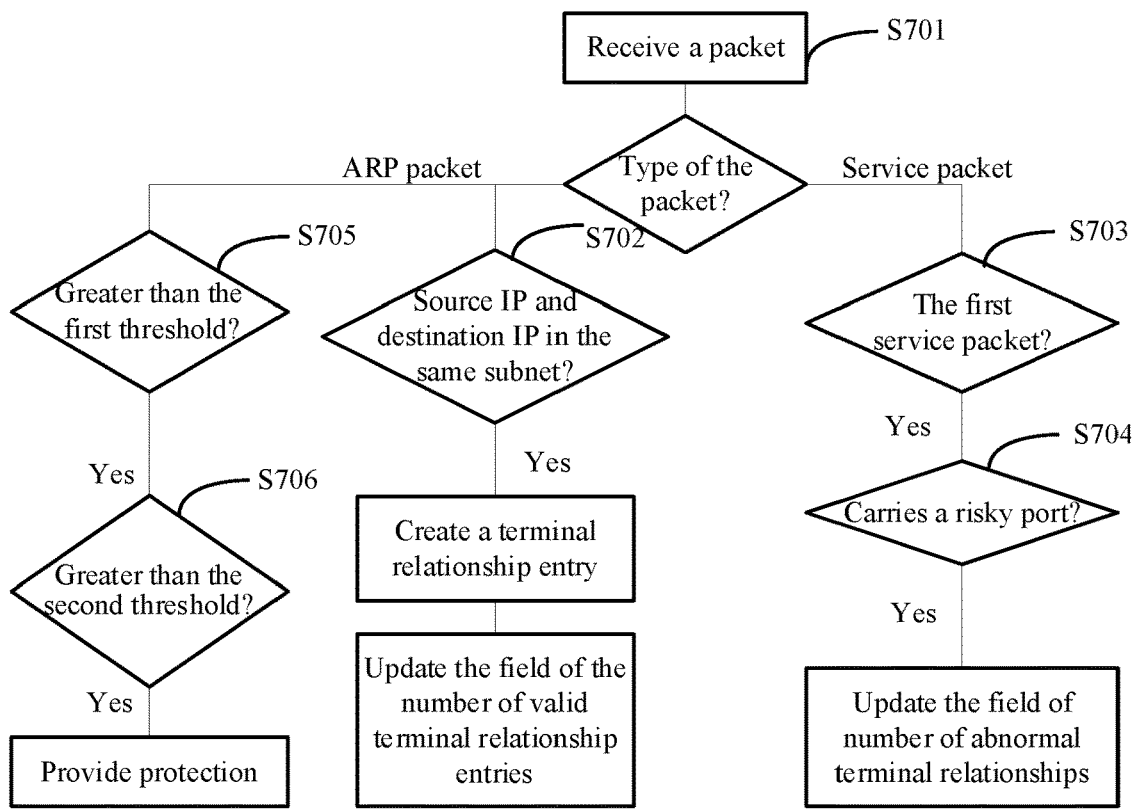
FIG. 7 is a flowchart illustrating a method for suppressing the spread of viruses in a LAN according to embodiments of the present disclosure.

FIG. 7 is a flowchart illustrating a method for suppressing the spread of viruses in a LAN according to the present disclosure. The method may be executed by the switch shown in FIG. 1. More specifically, the method may be executed by a control unit in the switch, e.g., CPU, FPGA, etc.

As shown in FIG. 7, at step S701, a traffic packet of any type sent by a target terminal in a LAN is received, a source IP address carried in the traffic packet is obtained, and a terminal entry corresponding to the target terminal is created based on the source IP address, The terminal entry may include an IP address field indicating the source IP address of the terminal, a terminal relationship table pointer, a field of a number of valid terminal relationship entries, and a field of a number of abnormal terminal relationships. It should be noted here that the terminal entry may be adjusted to include or exclude certain elements according to requirements. For example, the terminal entry may not include the field of the number of abnormal terminal relationships if the number of abnormal terminal relationships is not required to be counted. As another example, since the IP address of the terminal is subject to variation, in order to correspond the terminal entry to a unique terminal, the terminal entry may be created based on both the source IP address and the source MAC address carried in the traffic packet.

The field of the number of valid terminal relationships may represent a number of terminals in a LAN that have performed ARP interaction with the target terminal among the terminals in the LAN.

The terminal relationship table pointer may point to a terminal relationship table maintained by the switch for the terminal.

The terminal relationship table may include several terminal relationship entries, which may include a destination IP address field, a service identifier, an abnormal relationship identifier, and a field of creation time. The destination IP address field indicates the destination IP address carried in the ARP packet sent by the target terminal; the service identifier may indicate whether the service packet sent by the target terminal after the ARP packet is a first service packet; the abnormal relationship identifier indicates, if the service packet is the first service packet, whether the destination port number carried in the first service packet indicates a preset risky port (e.g., 135, 139, 445, 3389); and the field of creation time indicates the time the terminal relationship entry is created.

The field of the number of abnormal terminal relationships indicates the number of abnormal terminal relationships maintained by the switch. For one of the number of abnormal terminal relationships, the target terminal performs interaction with other terminal in the LAN by sending a first service packet with the preset risky port (e.g., 135, 139, 445, 3389) as the destination port.

In an example, after the terminal entry corresponding to the target terminal is created, the terminal entry may be initialized. For example, the following operations can be performed: setting the IP address field in the terminal entry to the source IP address of the traffic packet of any type; maintaining the terminal relationship table corresponding to the target terminal in the switch, and the terminal relationship table may be initialized as empty by default; initializing the field of the number of valid terminal relationships to 0; and initializing the field of the number of abnormal terminal relationships to 0.

As shown in FIG. 7, after receiving the packet of any type sent from the a terminal in the LAN, the type of the traffic packet can be determined first; if the traffic packet is an ARP packet, the source IP address of the ARP packet can be obtained, and the corresponding terminal entry can be searched based on the source IP address.

When the terminal entry is searched out, whether the destination IP address and the source IP address indicate a same subnet may be determined. If the destination IP address and the source IP address indicate the same subnet, the following steps may be performed; If the destination IP address and the source IP address do not indicate the same subnet, the ARP packet may not be processed.

In an example, the following steps may be performed: performing logic operations "AND" on the 8-bit subnet mask (i.e., "255.0.0.0") and the source IP address, and on the 24-bit subnet mask and the destination IP address, and determining whether the results of the logic operations are identical. If so, it is determined that the source IP address and the destination IP address indicate the same subnet; if not, it is determined that the source IP address and the destination IP address do not indicate the same subnet. When the destination IP address and the source IP address indicate the same subnet, the subsequent steps can be performed; when the destination IP address and the source IP address do not indicate the same subnet, the ARP packet may not be processed.

In this case, assuming that the destination IP address carried in the ARP packet and the source IP address are in the same subnet, the corresponding terminal relationship table can be determined based on the terminal relationship table pointer included in the terminal entry, and it can be determined, whether the terminal relationship entry corresponding to the destination IP address has been created in the terminal relationship table. If the terminal relationship entry has not been created, the terminal relationship entry corresponding to the destination IP address can be created, and the field of the number of valid terminal relationship entries can be updated; if the terminal relationship entry has been created, which indicates the terminal corresponding to the destination IP address has performed ARP interaction with the target terminal that initiated the APR packet, then no operation is performed.

In an example, when it is determined that the destination IP address and the source IP address indicate the same subnet, the terminal relationship table corresponding to the respective terminal entry of the target terminal can be searched for a terminal relationship entry corresponding to the destination IP address. If no such terminal relationship entry is found, the terminal relationship entry corresponding to the destination IP address can be created, and the field of the number of valid terminal relationship entries can be updated; if the terminal relationship entry is found, then no operation is performed.

When the terminal relationship entry corresponding to the destination IP address is created, the destination IP address field in the terminal relationship entry can be set to the destination IP address carried in the ARP packet; the service identifier in the terminal relationship entry can be set to 0 (assuming 0 represents that no first service message is received by the switch after the terminal relationship entry is created); the abnormal relationship identifier in the terminal relationship entry can be set to 0 (assuming 0 represents normal); and the creation time field in the terminal relationship entry is updated to a current time.

Through the above steps, the number of terminals included in a LAN that have performed ARP interaction with a target terminal among the terminals in the LAN can be counted accurately by using the field of the number of valid terminal relationship entries in the switch, thereby saving storage space of the switch.

After the terminal relationship entry is created, assuming that the switch receives a service packet (for example, a TCP packet) sent by the target terminal, step S703 may be performed to further determine whether the service packet is the first service packet. For example, the switch may determine the corresponding terminal relationship table according to the terminal relationship table pointer included in the terminal entry corresponding to the target terminal; then, search the terminal relationship table for the terminal relationship entry corresponding to the destination IP address carried in the service packet, and determine whether the service identifier included in the found terminal relationship table is 0 (for example, as a first preset identifier). If the service identifier is 0, the service packet can be determined as the first service packet, and the service identifier can be set to a non-zero value (e.g., 1). If the service identifier is not 0, the service packet can be determined as not the first service packet and may be left unprocessed.

Assuming that the received service packet determined at step S703 is the first service packet, step S704 may be performed to determine whether the destination port number carried in the first service packet indicates a preset risky port (e.g., 135, 139, 445, 3389). If so, the terminal relationship between the target terminal and a terminal indicated by the destination IP address is abnormal, the abnormal relationship identifier in the terminal relationship entry can be set to 1, and the field of the number of the abnormal terminal relationships can be increased by 1; if not, the service packet may not be processed.

Through the above steps, the number of interacting terminals corresponding to each terminal in the LAN and the number of abnormal terminal relationships can be counted in the switch.

In some cases, when the ARP packet sent by the target terminal is received, in addition to updating the number of interacting terminals corresponding to the target terminal, the switch can perform step S705, in which whether a number of interacting terminals corresponding to the target terminal that sent the ARP packet reaches a first preset threshold is determined by the switch. If it is true, the switch further performs step S706, in which whether a number of abnormal terminal relationships corresponding to the target terminal reaches a second preset threshold is determined by the switch. If this is also true, protection is provided to the target terminal so to suppress virus propagation in the LAN.

Upon performing step S705, whether the value indicated by the field of the number of valid terminal relationships included in the terminal entry reaches the first preset threshold may be determined, and if so, that the number of terminals included in the LAN that have performed ARP interaction with the target terminal in the LAN reaches the first preset threshold may be determined. Upon performing step S706, whether the value indicated by the field of the number of abnormal terminal relationships in the terminal entry corresponding to the target terminal reaches the second preset threshold may be determined, and if so, interaction between the target terminal and each of the other terminals may be limited.

In an example, the field of the number of valid terminal relationship entries may be aged based on the time when each of the terminal relationship entries is created, and the number of terminals in a LAN that have performed ARP interaction with the target terminal may be counted more accurately.

For example, the creation time fields included in the terminal relationship entries can be scanned periodically, and whether the difference between a current time and the creation time indicated by a creation time field is greater than a preset threshold can be determined. If so, the terminal relationship entry is deleted, and the field of the number of valid terminal relationship entries is updated accordingly; if not, the terminal relationship entry is kept.

In an example, a timing task can be configured in the switch to periodically scan the creation time field included in each of the terminal relationship entries. Then a difference between the value of the creation time field and the current time is calculated, and whether the difference is greater than the preset threshold is determined. If so, the terminal relationship entry is deleted, and the field of the number of valid terminal relationship entries is updated accordingly; if not, the terminal relationship entry is kept.

In an example, in order to retain the number of abnormal terminal relationships counted in the current aging cycle to the next aging cycle, when the field of the number of valid terminal relationship entries is periodically reset, among terminal relationship entries corresponding to the target terminal, only terminal relationship entry with an corresponding abnormal relationship identifier of other than 1 may be reset, and the abnormal relationship identifier that have been set to 1 may be reset to 2. For example, when the field of the number of valid terminal relationship entries is being aged, respective abnormal relationship identifiers in terminal relationship entries corresponding to terminals may be scanned first. If an abnormal relationship identifier is 1, then the corresponding terminal relationship entry is not deleted, the field of the number of valid terminal relationship entries is not updated, and if an abnormal relationship identifier is not 1, the corresponding abnormal relationship identifier is reset to 2, and the corresponding terminal relationship entry is deleted, and the field of the number of valid terminal relationship entries is updated.

In this way, the number of abnormal terminal relationships counted in the current aging cycle is retained to the next aging cycle, thereby avoiding the influence of the previously-counted number of abnormal terminal relationships being aged on the identification of the spread of viruses in determining whether the number of terminals included in a LAN that have performed ARP interaction with the target terminal reaches a first preset threshold among the terminals in the LAN.

Figure 8:
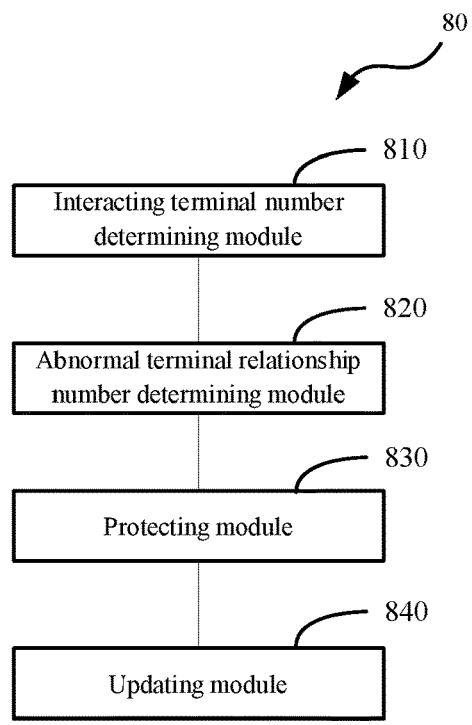
FIG. 8 is a structural diagram illustrating an apparatus for suppressing the spread of viruses in a LAN according to embodiments of the present disclosure.

Corresponding to the method embodiments, the present disclosure also provides an apparatus 80 for suppressing the spread of viruses in a LAN, which is applicable to a forwarding device. Referring to FIG. 8, a block diagram of an apparatus for suppressing the spread of viruses in a LAN according to the present disclosure, the apparatus 80 includes the following modules.

An interacting terminal number determining module 810, configured to determine, in response to that an ARP packet is received, whether a number of interacting terminals in the LAN that have performed ARP interaction with a target terminal that initiated the ARP packet reaches a first preset threshold.

An abnormal terminal relationship number determining module 820, configured to further determine, if the number of interacting terminals reaches the first preset threshold, whether a number of abnormal terminal relationships corresponding to the target terminal reaches a second preset threshold, wherein For one of the number of abnormal terminal relationships, the target terminal performs interaction with other terminal in the LAN by sending a first service packet of which a destination port belongs to preset risky ports, and the first service packet corresponds to a first one of service packets sent to the other terminal by the target terminal immediately after acquiring a MAC address of the other terminal by performing the ARP interaction with the other terminal.

A protecting module 830, configured to, if the number of abnormal terminal relationships reaches the second preset threshold, provide protection to the target terminal so to suppress virus propagation in the LAN.

In some examples, the apparatus 80 further includes: an updating module 840, configured to update the number of interacting terminals based on the ARP packet.

In some examples, the ARP packet includes: an ARP request packet and/or an ARP response packet.

In some examples, the apparatus 80 is further configured to: determine whether a number of first terminals with consecutive IP addresses among the interacting terminals reaches a third preset threshold; and if the number of first terminals with consecutive IP addresses reaches the third preset threshold, provide protection to the target terminal so to suppress virus propagation in the LAN.

In some examples, the apparatus 80 is further configured to: determine, in response to that the first one of service packets is received, whether a number of the destination port carried in the first one of service packets indicates one of the preset risky ports; and if the number of the destination port carried in the first one of service packets indicates one of the preset risky ports, update the number of abnormal terminal relationships.

In some examples, the first one of service packets includes a TCP packet; a UDP packet; a service packet of other types.

In some examples, the apparatus 80 further includes: a first obtaining module, configured to receive a traffic packet of any type sent by the target terminal, and obtain a source IP address and a source MAC address carried in the traffic packet; and a first terminal entry creating module, configured to create a terminal entry corresponding to the target terminal based on the source IP address and the source MAC address, wherein the terminal entry includes at least an IP address field indicating the source IP address of the target terminal, and a list pointer, where the list pointer points to a list maintained by the target terminal, and indexes to list entries in the list are host address in IP addresses.

In an embodiment illustrated herein, the list is a bitmap; the list pointer is a bitmap pointer; and the updating module 840 is further configured to: receive a packet of any type sent by the target terminal, and determine the type of the packet; if the packet is an ARP packet, obtain the source IP address of the ARP packet, and search for the corresponding terminal entry based on the source IP address; after the terminal entry is searched out, determine the corresponding bitmap based on the bitmap pointer included in the terminal entry; and determine the corresponding to-be-set identifier according to the host address indicated by the destination IP address carried in the ARP packet and set the to-be-set identifier accordingly.

In some examples, the updating module 840 is further configured to: determine a subnet mask of the destination IP address, and determine the host address indicated by the destination IP address based on the subnet mask; and search the bitmap for the corresponding identifier according to the host address, and determine the found identifier as the to-be-set identifier.

In an embodiment illustrated herein, the updating module 840 is further configured to: perform an AND logic operation on a first subnet mask and the source IP address carried in the ARP packet to obtain a first calculation result; perform an AND logic operation on the first subnet mask and the destination IP address carried in the ARP packet to obtain a second calculation result; determine whether the first calculation result is identical to the second calculation result; if the first calculation result is identical to the second calculation result, determine the first subnet mask as the subnet mask of the destination IP address; otherwise, perform an AND logic operation on a second subnet mask and the source IP address carried in the ARP packet to obtain a third calculation result; perform an AND logic operation on the second subnet mask and the destination IP address carried in the ARP packet to obtain a fourth calculation result; determine whether the third calculation result is identical to the fourth calculation result; if the third calculation result is identical to the fourth calculation result, determine the second subnet mask as the subnet mask of the destination IP address; otherwise, perform an AND logic operation on a third subnet mask and the source IP address carried in the ARP packet to obtain a fifth calculation result; perform an AND logic operation on the third subnet mask and the destination IP address carried in the ARP packet to obtain a sixth calculation result; determine whether the fifth calculation result is identical to the sixth calculation result; and if the fifth calculation result is identical to the sixth calculation result, determine the third subnet mask as the subnet mask of the destination IP address.

In some examples, the first subnet mask is a 24-bit subnet mast; the second subnet mask is a 16-bit subnet mask; and the third subnet mask is an 8-bit subnet mask.

In some examples, the terminal entry further includes a terminal relationship table pointer, the terminal relationship table pointer points to a terminal relationship table maintained for the target terminal, and the apparatus 80 further includes: a terminal relationship entry creating module, configured to determine the corresponding terminal relationship table according to the terminal relationship table pointer included in the terminal entry; and based on the destination IP address carried in the ARP packet, create a terminal relationship entry corresponding to the destination IP address in the terminal relationship table, wherein the terminal relationship entry includes a destination IP address field, and a service identifier, wherein the destination IP address field indicates the destination IP address carried in the ARP packet sent by the target terminal, and the service identifier indicates whether the service packet sent by the target terminal after sending ARP packets to other terminals in the LAN is the first service packet.

In an embodiment illustrated herein, the apparatus 80 is further configured to: after receiving a service packet sent by the target terminal, determine the corresponding terminal relationship table according to the terminal relationship table pointer included in the terminal entry corresponding to the target terminal; based on the destination IP address carried in the service packet, search the terminal relationship table for the terminal relationship entry corresponding to the destination IP address carried in the service packet, and determine whether the service identifier included in the found terminal relationship table is a first preset identifier; and if so, determine that the service packet is the first service packet, and update the service identifier to a second preset identifier.

In an embodiment illustrated herein, the protecting module 830 is further configured to: determine whether the value indicated by a field of a number of abnormal terminal relationships maintained in the terminal entry corresponding to the target terminal reaches a second preset threshold; if so, determine that the number of abnormal terminal relationships reaches the second preset threshold.

In an embodiment illustrated herein, the list is an array; the list pointer is an array pointer; and the updating module 840 is further configured to: receive a traffic packet of any type sent by the target terminal, and determine the type of the traffic packet; if the traffic packet is an ARP packet, obtain the source IP address of the ARP packet, and search for the corresponding terminal entry based on the source IP address; after the terminal entry is searched out, determine the corresponding array based on the array pointer included in the terminal entry; and determine the corresponding to-be-updated element according to the host address in the destination IP address carried in the ARP packet, and update the to-be-updated element accordingly.

In some examples, the updating module 840 is further configured to: determine the subnet mask of the destination IP address, and determine the host address indicated by the destination IP address based on the subnet mask; and search the array for the corresponding element according to the host address, and determine the found element as the to-be-updated element.

In some examples, the updating module 840 is further configured to: perform an AND logic operation on a first subnet mask and the source IP address carried in the ARP packet to obtain a first calculation result; perform an AND logic operation on the first subnet mask and the destination IP address carried in the ARP packet to obtain a second calculation result; determine whether the first calculation result is identical to the second calculation result; if the first calculation result is identical to the second calculation result, determine the first subnet mask as the subnet mask of the destination IP address; otherwise, perform an AND logic operation on a second subnet mask and the source IP address carried in the ARP packet to obtain a third calculation result; perform an AND logic operation on the second subnet mask and the destination IP address carried in the ARP packet to obtain a fourth calculation result; determine whether the third calculation result is identical to the fourth calculation result; if the third calculation result is identical to the fourth calculation result, determine the second subnet mask as the subnet mask of the destination IP address; otherwise, perform an AND logic operation on a third subnet mask and the source IP address carried in the ARP packet to obtain a fifth calculation result; perform an AND logic operation on the third subnet mask and the destination IP address carried in the ARP packet to obtain a sixth calculation result; determine whether the fifth calculation result is identical to the sixth calculation result; and if the fifth calculation result is identical to the sixth calculation result, determine the third subnet mask as the subnet mask of the destination IP address.

In some examples, the first subnet mask is a 24-bit subnet mask; the second subnet mask is a 16-bit subnet mask; and the third subnet mask is an 8-bit subnet mask.

In some examples, the apparatus 80 is further configured to: after receiving a service packet sent by the target terminal, determine the corresponding array according to the array pointer included in the terminal entry corresponding to the target terminal; based on the destination IP address carried in the service packet, search the array for the element corresponding to the host address in the destination IP address carried in the service packet, and determine whether the service identifier included in the found element is a first preset identifier; and if so, determine that the service packet is the first service packet, and update the service identifier to a different preset identifier.

In some examples, the protecting module 830 is further configured to: determine whether the value indicated by the field of the number of abnormal terminal relationships maintained in the terminal entry corresponding to the target terminal reaches a second preset threshold; if so, determine that the number of abnormal terminal relationships reaches the second preset threshold.

In some examples, the apparatus 80 further includes: a second obtaining module, configured to receive a traffic packet of any type sent by the target terminal, and obtain the source IP address and the source MAC address carried in the traffic packet; and a second terminal entry creating module, configured to create a terminal entry corresponding to the target terminal based on the source IP address and the source MAC address, wherein the terminal entry includes at least an IP address field indicating the source IP address of the target terminal, a terminal relationship table pointer, and a field of a number of valid terminal relationship entries, wherein the terminal relationship table pointer points to a terminal relationship table maintained for the target terminal, the field of the number of valid terminal relationship entries represents a number of terminals in a LAN that have performed ARP interaction with the target terminal.

In some examples, the updating module 840 is further configured to: receive a traffic packet of any type sent by the target terminal, and determine the type of the traffic packet; if the traffic packet is an ARP packet, obtain the source IP address of the ARP packet, and search for the corresponding terminal entry based on the source IP address; after the terminal entry is searched out, determine whether the destination IP address and the source IP address carried in the ARP packet are in the same subnet; if so, determine the corresponding terminal relationship table based on the terminal relationship table pointer included in the terminal entry, and determine whether a terminal relationship entry corresponding to the destination IP address has been created in the terminal relationship table based on the destination IP address; and if not, create a terminal relationship entry corresponding to the destination IP address, and update the field of the number of valid terminal relationships, wherein the terminal relationship entry includes a destination IP address field, and a service identifier, wherein the destination IP address field indicates the destination IP address carried in the ARP packet sent by the target terminal, and the service identifier indicates whether the service packet sent by the target terminal after sending ARP packets to other terminals in the LAN is the first service packet.

In some examples, the apparatus 80 is further configured to: after receiving a service packet sent by the target terminal, determine the corresponding terminal relationship table according to the terminal relationship table pointer included in the terminal entry corresponding to the target terminal; based on the destination IP address carried in the service packet, search the terminal relationship table for the terminal relationship entry corresponding to the destination IP address carried in the service packet, and determine whether the service identifier included in the found terminal relationship table is a first preset identifier; and if so, determine that the service packet is the first service packet, and update the service identifier to a second preset identifier.

In some examples, the protecting module 830 is further configured to: determine whether the value indicated by the field of the number of abnormal terminal relationships maintained in the terminal entry corresponding to the target terminal reaches a second preset threshold; if so, determine that the number of abnormal terminal relationships reaches the second preset threshold.

Figure 9:
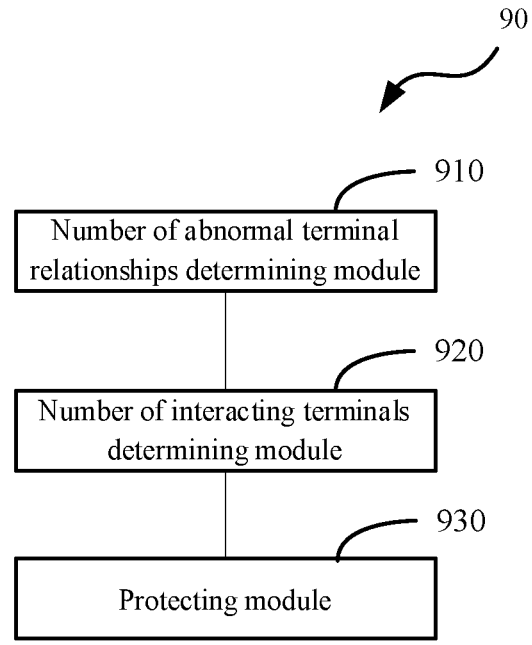
FIG. 9 is a structural diagram illustrating an apparatus for suppressing the spread of viruses in a LAN according to embodiments of the present disclosure.

Corresponding to the method embodiments, the present disclosure also provides an apparatus 90 for suppressing the spread of viruses in a LAN, which is applicable to a forwarding device. With reference to FIG. 9, a block diagram of an apparatus for suppressing the spread of viruses in a LAN according to the present disclosure, the apparatus 90 includes: an abnormal terminal relationship number determining module 910, configured to determine, in response to that a first service packet is received, whether a number of abnormal terminal relationships corresponding to a target terminal in a LAN that initiated the first service packet reaches a first preset threshold, wherein the first service packet corresponds to a first one of service-type packets sent to other terminal by the target terminal immediately after acquiring a MAC address of the other terminal by performing the ARP interaction with the other terminal, and for one of the number of abnormal terminal relationships, the target terminal performs interaction with a second terminal in the LAN by sending a first service packet of which a destination port belongs to preset risky ports; an interacting terminal number determining module 920, configured to, if the number of abnormal terminal relationships reaches the first preset threshold, determine whether a number of interacting terminals in the LAN that have performed ARP interaction with the target terminal reaches a second preset threshold; a protecting module 930, configured to, if the number of interacting terminals reaches the second preset threshold, provide protection to the target terminal so to suppress virus propagation in the LAN.

Figure 10:
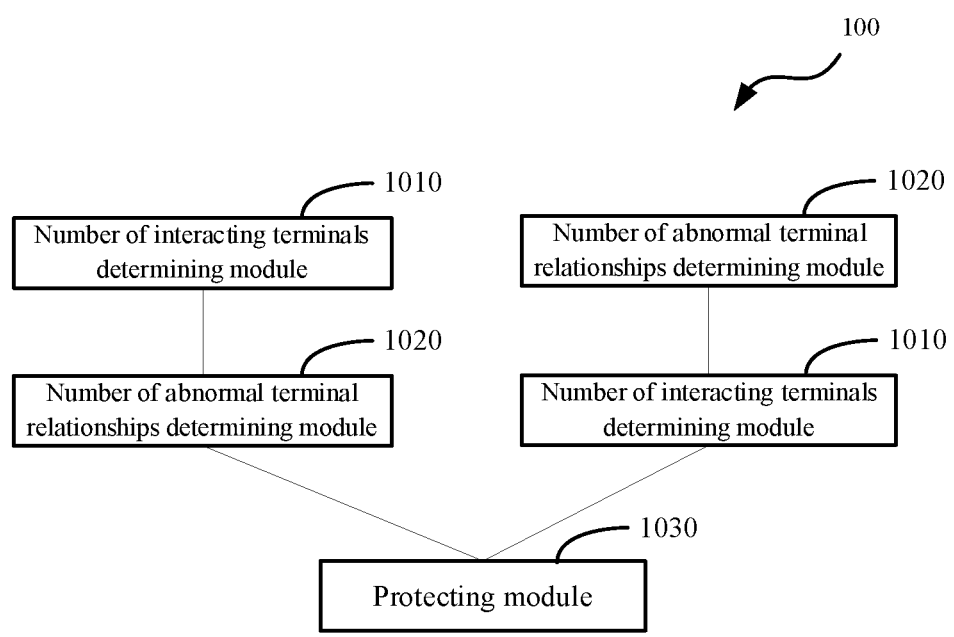
FIG. 10 is a structural diagram illustrating an apparatus for suppressing the spread of viruses in a LAN according to embodiments of the present disclosure.

Corresponding to the method embodiments, the present disclosure also provides an apparatus 100 for suppressing the spread of viruses in a LAN, which is applicable to a forwarding device. With reference to FIG. 10, a block diagram of an apparatus for suppressing the spread of viruses in a LAN according to the present disclosure, the apparatus 100 includes: an interacting terminal number determining module 1010, configured to determine, when an ARP packet is received, whether a number of interacting terminals corresponding to a first target terminal that initiated the ARP packet reaches a first preset threshold, wherein the number of interacting terminals includes a number of terminals included in a LAN that have performed ARP interaction with the first target terminal in the LAN; an abnormal terminal relationship number determining module 1020, configured to further determine, if the number of interacting terminals reaches the first preset threshold, whether a number of abnormal terminal relationships maintained by the forwarding device reaches a second preset threshold, wherein the number of abnormal terminal relationships includes a number of terminal relationships in which the target terminal performs interaction by sending a first service packet with a preset risky port as the destination port; and the first service packet includes a first one of service-type packets sent by the target terminal in the LAN to other terminals in the LAN after obtaining the MAC addresses of the other terminals through ARP interaction with the other terminals; a protecting module 1030, configured to provide protection to the first target terminal so to suppress virus propagation in the LAN, if the number of abnormal terminal relationships reaches the second preset threshold; an abnormal terminal relationship number determining module 1020, configured to determine, when the first service packet is received, whether a number of abnormal terminal relationships corresponding to a second target terminal that sent the first service packet reaches a third preset threshold; an interacting terminal number determining module 1010, configured to further determine, if the number of abnormal terminal relationships reaches the third preset threshold, whether a number of interacting terminals corresponding to the second target terminal reaches a fourth preset threshold; and a protecting module 1030, configured to provide protection, if the number of interacting terminals reaches the fourth preset threshold, to the second target terminal so to suppress virus propagation in the LAN.

Refer to the corresponding steps in the methods for how the functions and effects of the units in the apparatuses are implemented, which will not be elaborated here.

Since the device embodiments essentially correspond to the method embodiments, reference can be made to the method embodiments for relevance. The device embodiments described above are only schematic, wherein the units described as separate components may or may not be physically separated, and the components displayed as units may or may not be physical units, that is, may be located in one place or distributed to multiple units in a network. Some or all of the modules may be selected according to actual needs to achieve the objectives of the embodiments of the present disclosure. Those of ordinary skill in the art can understand and implement without creative efforts.

The apparatus embodiments of the present disclosure can be applied to a forwarding device. The apparatus embodiments may be implemented by software, hardware or a combination of hardware and software. When implemented by software, as logical apparatuses, the embodiments are implemented by the processor of the forwarding device where the apparatus is located reading the corresponding computer program instructions in the non-volatile storage device into the memory.

Figure 11:
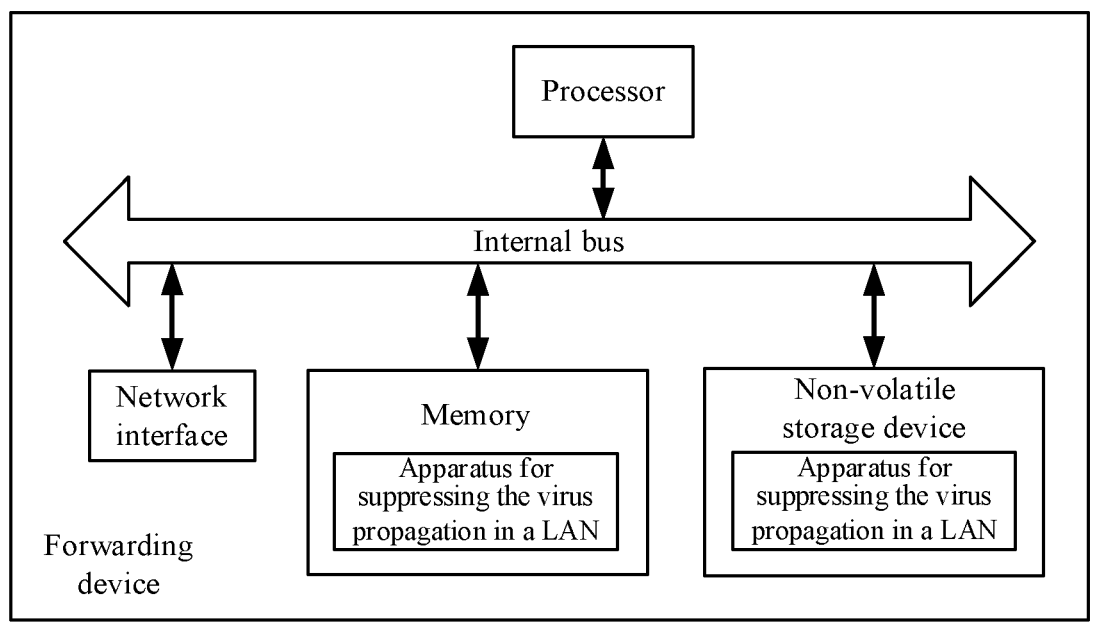
FIG. 11 is a diagram illustrating a hardware structure of a forwarding device for suppressing the spread of viruses in a LAN according to embodiments of the present disclosure.

FIG. 11 is a diagram of hardware structure of a forwarding device that suppresses the spread of viruses in a LAN, the forwarding device may include: a memory, a processor, and program instructions stored on the memory and executable by the processor, which, when executed by the processor, causes the processor to implement the method of suppressing the spread of viruses in a LAN according to any embodiment of the above. For example, when the program instructions are executed by the processor, the following operations may be performed:

determining, in response to that a first service packet is received, whether the destination port carried in the first service packet indicates one of preset risky ports; wherein the first service packet includes a first one of service-type packets sent by the target terminal in a LAN to other terminals in the LAN after obtaining the MAC addresses of the other terminals through ARP interaction with the other terminals; determining, if the destination port is the preset risky port, whether a number of interacting terminals corresponding to a target terminal that sent the service packet reaches a first preset threshold, wherein the number of interacting terminals includes a number of terminals included in the LAN that have performed ARP interaction with the target terminal in the LAN; providing protection to the target terminal so to suppress virus propagation in the LAN if the number of interacting terminals reaches the first preset threshold.

Embodiments of the subject matter, functions and operations described in the present disclosure can be implemented in: digital electronic circuits, tangibly embodied computer software or firmware, computer hardware including the structures and structural equivalents disclosed in the present disclosure, or a combination of one or more of the above. Embodiments of the subject matter described in this disclosure can be implemented as one or more computer programs, that is, one or more modules of computer program instructions encoded on a tangible non-transitory program carrier to be executed by a data processing device or to control the operation of the data processing device. Alternatively or additionally, the program instructions may be encoded on an artificially generated propagation signal, such as a machine-generated electrical, optical, or electromagnetic signal, which is generated to encode and transmit the information to a suitable receiver device for execution by the data processing device. The computer storage medium may be a machine-readable storage device, a machine-readable storage substrate, a random or serial access memory device, or a combination of one or more of the above.

Processes and logic flows described in the present disclosure can be performed by one or more programmable computers that execute one or more computer programs to perform corresponding functions by operating according to input data and generating output. The above processes and logic flow may also be performed by dedicated logic circuits such as FPGA (field programmable gate array) or ASIC (application specific integrated circuit), and the device may also be implemented as a dedicated logic circuit.

Computers suitable for executing computer programs include, for example, general-purpose and/or dedicated microprocessors, or central processing units of any other type. Typically, a central processing unit receives instructions and data from read-only memory and/or random access memory. Basic components of a computer include a central processing unit for implementing or executing instructions and one or more memory storage device for storing instructions and data. Typically, a computer also includes one or more mass storage devices for storing data, such as magnetic disks, magneto-optical disks, or optical disks, or the computer is operably coupled to such mass storage device to receive data therefrom, transmit data thereto, or both. However, such a device is not required of a computer. In addition, the computer can be embedded in another device, such as a mobile phone, personal digital assistant (PDA), mobile audio or video player, game console, global positioning system (GPS) receiver, or, portable storage devices such as universal serial bus (USB) flash drives, to name a few.

Computer-readable media suitable for storing computer program instructions and data include all forms of non-volatile memory, media, and memory devices, including, for example, semiconductor memory devices (such as EPROM, EEPROM, and flash memory devices), magnetic disks (such as internal hard drives, or Mobile disk), magneto-optical disks and CD ROM and DVD-ROM disks. The processor and memory may be supplemented by, or incorporated in, dedicated logic circuits.

Although this disclosure contains many specific implementation details, these should not be construed as limiting the scope of protection claimed, but are mainly used to describe features of specific embodiments of specific disclosures. Certain features described in multiple embodiments in this disclosure can also be implemented in combination in a single embodiment. On the other hand, various features described in a single embodiment can also be implemented separately in multiple embodiments or in any suitable subcombination. Furthermore, although features may function in certain combinations as described above and even initially claimed, one or more features from the claimed combinations may in some cases be removed from the combinations and the claimed combinations can point to sub-combinations or variations of sub-combinations.

Similarly, although the operations are depicted in a specific order in the drawings, this should not be construed as requiring these operations to be performed in the specific order shown, or to be performed sequentially, or requiring all illustrated operations to be performed to achieve the desired result. In some cases, multitasking and parallel processing may be advantageous. In addition, the separation of various system modules and components in the above embodiments should not be understood as requiring such separation in all embodiments, and it should be understood that the described program components and systems can generally be integrated together in a single software product, or packaged into multiple software products.

The above are merely preferred embodiments of the present disclosure and are not intended to limit the present disclosure. Any modification, equivalent replacement, improvement, etc. made within the spirit and principles of the present disclosure shall all belong to the scope of protection of the present disclosure.

The invention claimed is:

1. A method for suppressing virus propagation in a local area network (LAN), being applicable to a forwarding device, comprising:

in response to receiving a first service packet initiated by a target terminal, determining whether a number of abnormal terminal relationships corresponding to the target terminal in a LAN reaches a first preset threshold, wherein the first service packet corresponds to a first one of service packets sent to other terminal by the target terminal immediately after acquiring a MAC address of the other terminal by performing the ARP interaction with the other terminal, and for one of the number of abnormal terminal relationships, the target terminal performs interaction with a second terminal in the LAN by sending a first service packet of which a destination port belongs to preset risky ports;

in response to that the number of abnormal terminal relationships reaches the first preset threshold, determining whether a number of interacting terminals in the LAN that have performed ARP interaction with the target terminal reaches a second preset threshold; and in response to that the number of interacting terminals reaches the second preset threshold, providing protection to the target terminal so to suppress virus propagation in the LAN;

providing protection to the target terminal so to suppress virus propagation in the LAN comprises:

determining whether a number of first terminals reaches a third preset threshold, wherein the number of first terminals are terminals in the interacting terminals of which Internet protocol (IP) addresses are consecutive; and in response to that the number of the first terminals reaches the third preset threshold, providing protection to the target terminal to suppress virus propagation in the LAN.

2. The method of claim 1, further comprising:
updating the number of interacting terminals based on the ARP packet, wherein the ARP packet comprises an ARP request packet and/or an ARP response packet.

3. The method of claim 1, further comprising:
in response to receiving the first service packet, determining whether a destination port number carried in the first service packet indicates one of the preset risky ports; and
in response to that the destination port number carried in the first service packet indicates one of the preset risky ports, updating the number of abnormal terminal relationships.

4. The method of claim 1, wherein the first one of service packets comprises: a TCP packet and/or a UDP packet.

5. A forwarding device in a LAN, comprising:
a processor;
a memory for storing program instructions that are executable by the processor to implement following operations comprising:

in response to receiving a first service packet initiated by a target terminal, determining whether a number of abnormal terminal relationships corresponding to the target terminal in a LAN reaches a first preset threshold, wherein the first service packet corresponds to a first one of service packets sent to other terminal by the target terminal immediately after acquiring a MAC address of the other terminal by performing the ARP interaction with the other terminal, and for one of the number of abnormal terminal relationships, the target terminal performs interaction with a second terminal in the LAN by sending a first service packet of which a destination port belongs to preset risky ports;

in response to that the number of abnormal terminal relationships reaches the first preset threshold, determining whether a number of interacting terminals in the LAN that have performed ARP interaction with the target terminal reaches a second preset threshold; and in response to that the number of interacting terminals reaches the second preset threshold, providing protection to the target terminal so to suppress virus propagation in the LAN;

providing protection to the target terminal so to suppress virus propagation in the LAN comprises:

determining whether a number of first terminals reaches a third preset threshold, wherein the number of first terminals are terminals in the interacting terminals of which Internet protocol (IP) addresses are consecutive; and in response to that the number of the first terminals reaches the third preset threshold, providing protection to the target terminal to suppress virus propagation in the LAN.

6. The forwarding device of claim 5, wherein the program instructions are executable by the processor to further perform the operation comprising:
updating the number of interacting terminals based on the ARP packet, the ARP packet comprising an ARP request packet and/or an ARP response packet.

* * * * *